United States Patent
Tabor

(10) Patent No.: US 8,860,902 B2
(45) Date of Patent: Oct. 14, 2014

(54) DISPLAY UNIT WITH AN INTEGRATED BACKLIGHT

(75) Inventor: Guenter Tabor, Tettnang (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 698 days.

(21) Appl. No.: 12/966,653

(22) Filed: Dec. 13, 2010

(65) Prior Publication Data

US 2011/0141389 A1  Jun. 16, 2011

(30) Foreign Application Priority Data

Dec. 14, 2009 (EP) .................................. 09015443

(51) Int. Cl.
*G02F 1/1333* (2006.01)
*G02F 1/1335* (2006.01)

(52) U.S. Cl.
CPC ............ *G02F 1/133615* (2013.01); *G02F 2001/133314* (2013.01); *G02F 2001/133628* (2013.01); *G02F 2001/133322* (2013.01); *G02F 2001/133334* (2013.01); *G02F 1/133308* (2013.01)
USPC ................................................ 349/58; 349/65

(58) Field of Classification Search
USPC ........................................................ 349/58–65
See application file for complete search history.

(56) References Cited

U.S. PATENT DOCUMENTS

2006/0243948 A1* 11/2006 Ishiwa et al. ............. 252/299.61
2007/0211191 A1* 9/2007 Cho et al. ........................ 349/58
2008/0273139 A1 11/2008 Sugawara et al. ............... 349/58
2009/0147175 A1 6/2009 Tsumura et al.
2009/0153780 A1 6/2009 Takata ............................. 349/74

FOREIGN PATENT DOCUMENTS

| JP | 3075569 U | 2/2001 |
| JP | 2004-21104 | 1/2004 |
| JP | 2005-084270 A | 3/2005 |
| JP | 2006-267936 A | 10/2006 |
| JP | 2009-139704 A | 6/2009 |

OTHER PUBLICATIONS

European Patent Office Search Report dated Jun. 1, 2010, issued in European Patent Application No. 09015443.6, 7 pgs.

* cited by examiner

*Primary Examiner* — Bumsuk Won
*Assistant Examiner* — Charles Chang
(74) *Attorney, Agent, or Firm* — Patterson & Sherian, LLP

(57) ABSTRACT

A display device includes an integrated liquid crystal display and a backlight unit. The liquid crystal display is provided with a backlight system that includes a light-emitting element positioned along one or more sides of the display. In order to efficiently distribute and dissipate the heat produced by the light-emitting element, the backlight cover can cover the light-emitting elements and the area over the liquid crystal display. For shielding, the backlight cover can separate the display from an electronic circuit assembly. The backlight cover may be made monolithically of a heat-conductive material such as aluminum, as well as an electro-conductive material for shielding. The backlight cover may also provide mechanical support for the display device and mounting features to ease assembly and mounting to a target location. Such a display device may be deployed on a vehicle, for instance, as part of a vehicle navigation, communication, and/or entertainment system.

36 Claims, 22 Drawing Sheets

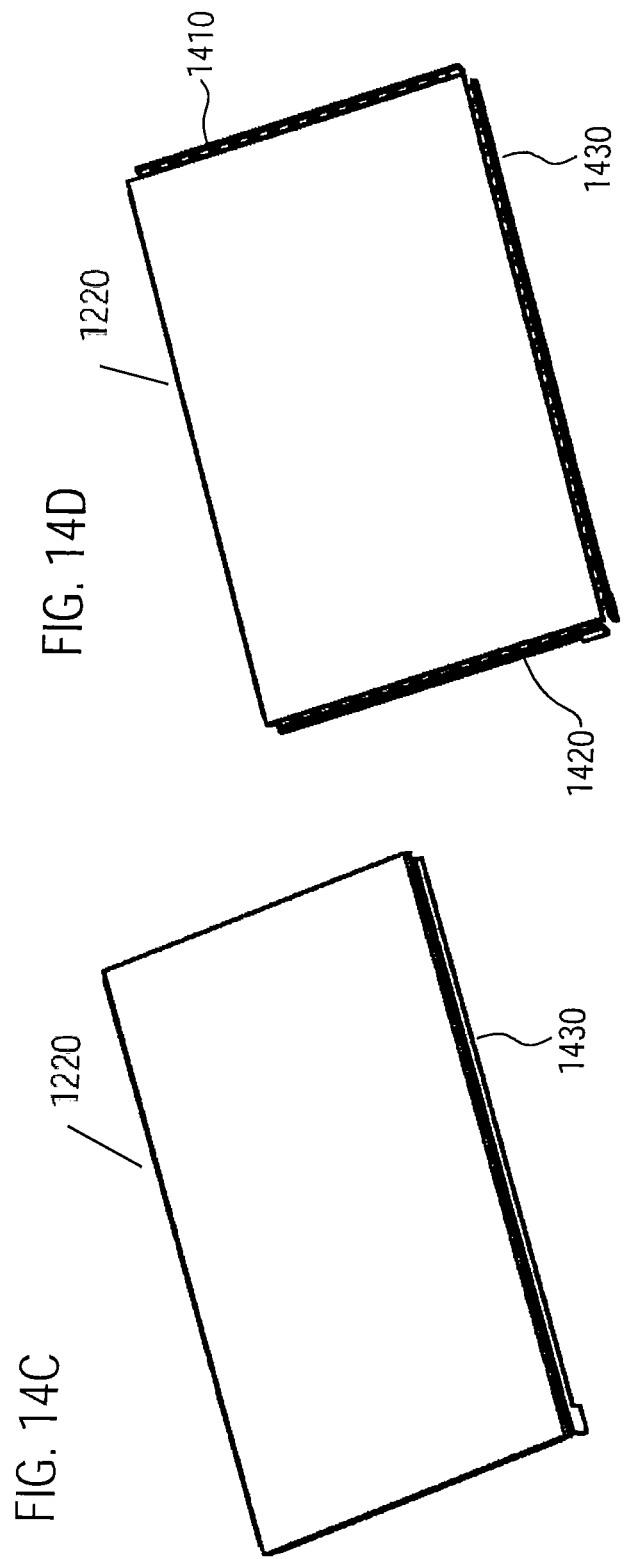

DISPLAY UNIT WITH AN INTEGRATED BACKLIGHT

BACKGROUND OF THE INVENTION

1. Priority Claim

This application claims the benefit of priority from European Patent Application 09015443.6, filed Dec. 14, 2009, which is incorporated by reference.

2. Technical Field

The present invention relates to a display device with a liquid crystal display and a backlight.

3. Related Art

Liquid crystal displays have found broad deployment in various technology applications such as personal computers, multimedia equipment, mobile phones, etc. Liquid crystal displays (LCD) have also been successfully employed in navigation and/or entertainment systems for transportation means such as aircrafts, trains, or vehicles such as vehicles or autobuses. Nowadays, vehicles may have a plurality of information and entertainment devices on board for distributing various image display signals to the driver and, in addition, to the other passengers. This is accomplished by separate displays each capable of displaying a different image signal. For instance, a first display device may be provided for the driver and a second or additional device may be provided for the other passengers. As the driver needs to concentrate on the surrounding traffic flow, the driver's display may only provide essential information whereas the passengers' displays may also reproduce image details. Such displays may also be used for the display of video images or other control information of any vehicle information and entertainment device, such like a television or radio receiver, a digital video disc (DVD) player, a cell phone, an Internet access device, vehicle control devices, a vehicle rearview device, etc.

The displays provided for vehicle navigation, communication, and entertainment systems may require higher temperature resilience and mechanical load capacity through vibration. Moreover, because of the possibly changing light conditions in a vehicle, the liquid crystal displays may be provided with a suitable backlight and capable of reproducing a high contrast.

Backlight may be necessary for the liquid crystal displays to increase readability in low light conditions. For instance, in computer monitors cold cathode fluorescent lamps are typically employed in combination with a diffuser. Advances in production of light-emitting diodes (LED), which is a point source of light, enable employment of LEDs as a backlight, especially in smaller LCD screens such as screens of mobile phones. White or red, green, blue (RGB) have also been employed as a backlight for computer screens. For the picture quality of liquid crystal displays, the uniformity of backlighting plays an important role. Therefore, in order to provide an even backlighting, diffusers are used, which is typically a layer of plastic that diffuses the light emitted by the light source(s). However, especially when light-emitting elements generating heat such as LEDs are employed, the heat generated by the LEDs, when not appropriately dissipated, may raise the temperature within the housing and may reduce the quality and the lifetime of such a display device.

Mounting displays into a target location such as a dashboard of a vehicle may be problematic. The active area of the display may be partially covered by other mechanical parts of the display device such as diverse frames and housings if the display device is improperly mounted. Accurate positioning may be more difficult when more mechanical elements are used in the display device. Even if the tolerances (uncertainty in the position) of each mechanical element involved are small, the chain of tolerances caused by the sum of these uncertainties of each mechanical element and may result in imprecise positioning of the liquid crystal display screen with respect to the target location.

Providing displays for vehicle applications such as personal vehicles may also be challenging due to the high requirements on electromagnetic compatibility. Nowadays many electronic devices, including several antennas covering different frequency bands, measurement and control electronic, etc. are mounted on the board of a vehicle. This simultaneous function of a multiple electronic devices in such a limited space may also be problematic.

Therefore, a need exists for a display device with a LCD display and backlight arrangement that may reduce the adverse effects of heat generated from the backlight on the LCD display. In addition, a need exists for a display device with a LCD display and backlight arrangement that may reduce the tolerance chains of components for more precise assembling of the display device and positioning at a target location, as well as reduce the electromagnetism of the display device.

SUMMARY

A display device may have a liquid crystal display with a backlight based on a light-emitting element. The display device is capable of an effective dissipation of the heat generated by at least the light-emitting element and/or the liquid crystal display. Effective heat dissipation may increase the performance and the lifetime of liquid crystal display devices that may otherwise decrease with a temperature raised by the source of backlight. Further, the display device may include a backlight cover coupled to the light-emitting element. The backlight cover may enable effective heat dissipation. The backlight cover may also provide shielding, mechanical support, and housing to the electronic circuitry assembly; structural integrity to the display device; and mounting features to ease assembly and mounting to a target location. A single backlight cover, monolithically formed, may be capable of providing some or all of these features. Such a display may be particularly suitable for deployment within a vehicle, for instance, as part of a vehicle navigation, vehicle communication and/or entertainment system.

In one example, a display frame may be coupled to the liquid crystal display. The light-emitting elements may be arranged along at least one side of the liquid crystal display. The backlight cover may have an enclosure wall that separates a first enclosure and a second, opposite enclosure. The backlight cover may be made of a heat-conducting material to dissipate heat generated by at least one of the liquid crystal display and the light-emitting elements. The display frame and the backlight cover may be coupled to one another. An electronic circuit assembly that is operably coupled to at least one of the liquid crystal display and the light-emitting elements may be housed within the second enclosure of the backlight cover.

In another example, the display device may include an integrated LCD and backlight unit. The integrated unit may include a display frame and a liquid crystal display fixed to the display frame. A first housing cover may enclose the integrated LCD and backlight unit. The backlight cover may include an engaging member(s) for centering in the x-direction, and an engaging member(s) for centering in the y-direction. The display frame may also include engaging members that may couple to the corresponding engaging members of the backlight cover. The first housing cover may include engaging members that may also couple to the corresponding engaging members of the backlight cover.

In another example, the display frame may have a display enclosure that faces opposite a first face of the display frame. A backlight cover may have an enclosure wall separating a first backlight enclosure and a second backlight enclosure. The first backlight enclosure may be coupled to a light-emitting element. The display enclosure of the display frame may be directly coupled to the first backlight enclosure of the backlight cover. The electronic circuit assembly may be supported by the second backlight enclosure of the backlight cover. A first housing cover and a second housing cover may enclose the display frame and the backlight cover. The second housing cover may be directly coupled to the second backlight enclosure of the backlight cover, and arranged to enclose the electronic circuit assembly. The second housing cover may be directly coupled to the backlight cover, and arranged to enclose the liquid crystal display, the display frame, and a portion of the backlight cover.

Other systems, methods, features and advantages will be, or will become, apparent to one with skill in the\ art upon examination of the following figures and detailed description. It is intended that all such additional systems, methods, features and advantages within the description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 14C is a schematic drawing of an example positioning of light-emitting elements along a single side of a display device.

FIG. 14D is a schematic drawing of an example positioning of light-emitting elements along three sides of a display device.

DETAILED DESCRIPTION OF THE PREFERRED EMBODIMENTS

Figure 1:
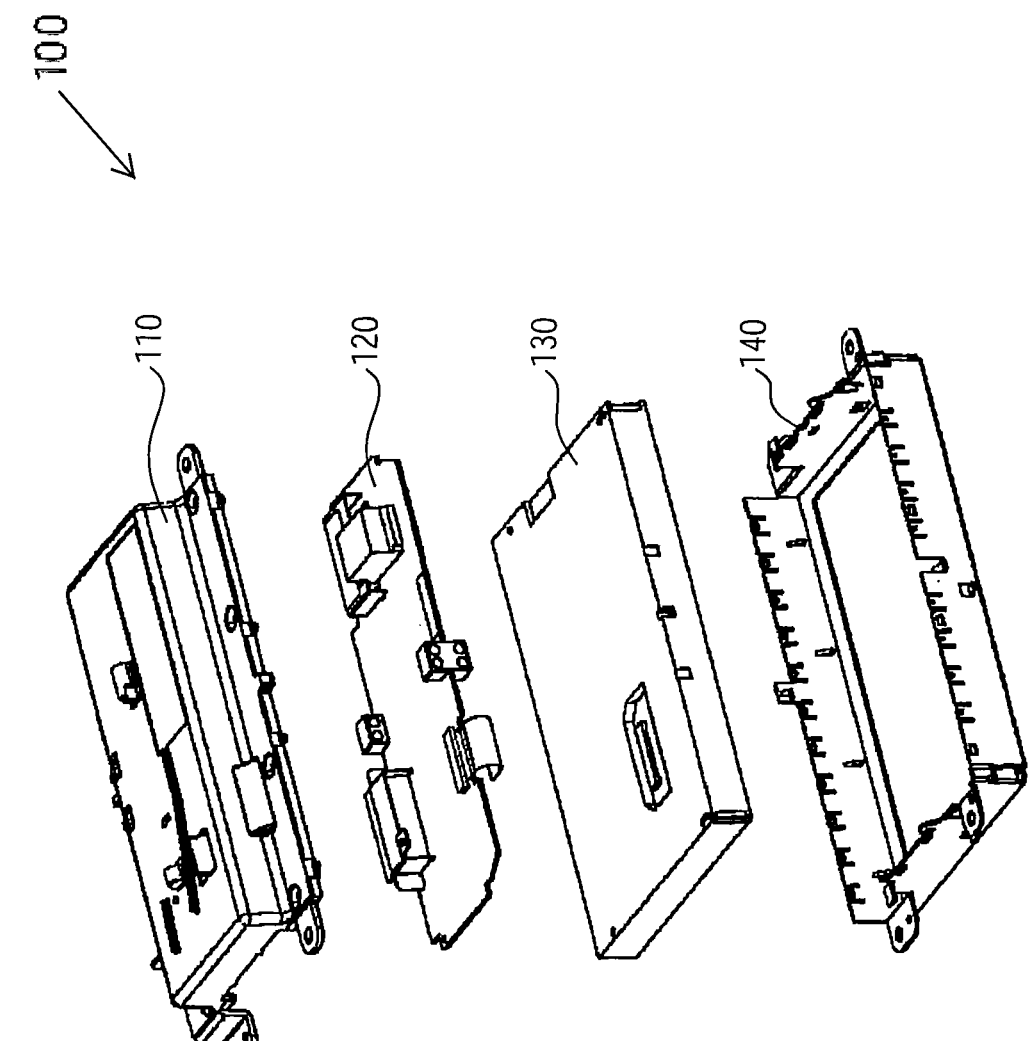
FIG. 1 is an exploded perspective view of components of an example display device.

In order to provide a navigation, communication, and entertainment system for vehicles, efficient and reliable display devices are necessary. Accordingly, a display device includes a display, such as a liquid crystal display, with a backlight based on light-emitting elements, which is capable of an effective dissipation of the heat generated by these light-emitting elements. Effective heat dissipation may increase the performance and the lifetime of display devices that may otherwise decrease with a temperature raised by the source of backlight.

In one example, a display device is provided with a liquid crystal display backlighted by one or more light-emitting elements placed along a side of the liquid crystal display. A heat conducting cover may cover not only the light-emitting elements but also the area of the crystal display to dissipate heat generated by the light-emitting elements. Such an approach may provide efficient heat dissipation via the entire heat-conducting cover rather than by a heat-conducting part located only in the area of the backlight source. At the same time, the heat-conducting cover may serve as shielding and a housing, by separating the LCD and backlight source from the electronic circuitry. The efficient heat dissipation may further improve the performance (accuracy in the visible light range) and increases the lifetime of the display device.

In one aspect, a display apparatus may include a liquid crystal display, a backlight unit, and electronic circuitry. The liquid crystal display and the backlight unit are separated from the electronic circuitry by a backlight cover made of a heat-conducting material in order to dissipate the heat generated by the backlight unit. The backlight unit may include light-emitting elements for backlighting the liquid crystal display. The light-emitting elements may be arranged along at least one side of the backlight cover.

The backlight cover may be made of a heat-conducting material and/or an electro-conductive material in order to act as a shielding between the electronic circuitry and the integrated LCD and backlight unit. In particular, the backlight cover may be made of aluminum, which may also have the advantage of being relatively light weight. However, other heat and/or electro-conductive materials may equally be used. The backlight cover may be produced by diecast.

The light-emitting elements may be point light sources such as light-emitting diodes (LEDs) located on a printed circuit board such as a flexible printed circuit board (flexiboard). LEDs may provide an intensive light and are relatively reliable in conditions of the deployment in a vehicle. In particular, LEDs may have better starting properties than the cold cathode fluorescent lamps especially at low outside temperatures, and may be more resistant to vibrations and impacts. The light-emitting elements may be located along two opposite sides of the display unit within the first face of the backlight cover. The light-emitting elements may be placed along the two shorter opposite sides of the display, in the case where the display has a rectangular but not a square shape. However, the light-emitting elements may also be located along the longer sides of a rectangular shaped display. The display device is not limited to light-emitting elements located on two opposite sides of the display unit. A backlight made with light-emitting elements placed on two adjacent sides, normal to each other, may also be adopted. The number of light-emitting elements may be selected according to the size of the display device. For instance, for 17.8 or 20.3-centimeter (7 or 8-inch) displays, 16 to 24 light-emitting elements per side may be used. In another aspect, the light-emitting elements may be placed along a single side of the display unit. In this case, a longer side may be selected in order to provide a sufficient light intensity. However, a shorter side may be selected as well. The display device is not limited to a backlight positioned along a single side or along two sides of the display unit. Three or even all four sides of the display device may be used for placement of the light-emitting elements.

The backlight cover may include mounting means for mounting the display apparatus into a target location. This arrangement may make the backlight cover a part of a cabinet housing, in which the display device may be encased. In particular, the mounting means may be positioned at the sides of the backlight cover. Providing such mounting means may increase the stability of the position of the entire display device, including the liquid crystal display, to make such a display device particularly suitable for deployment in vehicles. The mounting means may further enable fast mounting and a reduced number of additional mechanical parts necessary for placing the display device at a target location. This arrangement may result in the shortening of the tolerance chain of the assembled components, as well as increase the accuracy of positioning the LCD screen within the target location. The mounting means may be protrusions that are fixed to or engaged with the target location by a fastener such as a screw or a rivet. In order to facilitate mounting, the protrusions may be formed to include holes. In addition or alternatively to the mounting means, centering means may be provided, for instance as engaging elements to be engaged and possibly fixed or locked within corresponding engaging elements on the target location. Providing the centering means may increase the accuracy of positioning the LCD screen within the target location. Since the mounting means may cause an uncertainty in the positioning, the centering elements may improve this tolerance. In one example, the backlight cover includes centering means for pre-adjusting the position of the liquid crystal display within the backlight cover. The centering means may be formed for instance, as one or more pins, ribs, protrusions, notches, gaps, cut-outs, slots, or some other form of fastening mechanism. The liquid crystal display panel may be fixed (for instance glued) to a display panel frame. The display panel frame may also provide centering means corresponding to the centering means of the backlight cover in order to adjust the mutual positions of the display panel with respect to the backlight cover.

The display apparatus may further include a cabinet housing for encasing the liquid crystal display, the light-emitting elements, the backlight cover, and the electronic circuit assembly. The cabinet housing may include openings for dissipating heat and cooling the display apparatus. The openings may be located on the sides of the cabinet housing and on the second face of the cabinet housing. The first face of the cabinet housing may include the image display area of the liquid crystal display. The openings enable cooling of the display device and efficient heat dissipation from the backlight cover and electronics to the outside of the housing. Efficient cooling of the display device may extend the lifetime and reliability of display device components.

The liquid crystal display may be a thin film transistor liquid crystal display having a diagonal length of about 10.2 to 28 cm (about 4 to 11 inches). However, other sizes—smaller or larger—may also be applied. The integrated liquid crystal display and backlight unit may include a reflector for reflecting the light towards the user, a light guide plate for guiding the light provided by the light-emitting elements within the area covering the liquid crystal display, and a diffuser for uniformly diffusing the light. The reflector, the light guide plate, and the diffuser may be stacked between the backlight cover and the liquid crystal display. The backlight unit may further include a polarization foil, a brightness enhancement foil(s), and/or other foils for improving the display image quality. The liquid crystal display may be a monochromatic or a color display.

The electronic circuit assembly may include both display and backlight driving as well as display and backlight control circuitry. The display control circuitry may include, for instance, a graphical interface, an image display generator, a microcontroller, or other electronic components. The electronic circuit assembly may include all the electronics included in the display housing, which are necessary for driving and controlling the display device and the backlight. Locating the electronic circuitry of the display device and the backlight near the second face of the backlight cover may provide shielding and allow for a compact design of the display device. The display apparatus may include a shielding covering on the opposite face of the electronic circuit assembly. This shielding covering may be a part of the housing.

A navigation, communication, and entertainment system for a vehicle is provided. The navigation, communication, and entertainment system may include at least one display apparatus as described above for displaying image and/or video data, a graphic processor for generating an image display input signal to be displayed on the display apparatus, and a central control unit for controlling the operation of the graphic processor. The central control unit may be, for instance, a central processor unit (CPU) configured to provide the data to be presented as an image. The graphic processor may provide a representation of the data for the liquid crystal display. The graphics processor may be located within the housing of the display device or found exterior to the housing such as from the vehicle. Alternatively, the CPU may perform graphics and the graphics processor may be omitted. In one example, the CPU is located on the exterior of the display housing. A single CPU may be employed for controlling a plurality of display devices in the navigation, communication, and entertainment systems. Such a navigation, communication, and entertainment system may be capable of providing different image information for different display devices concurrently. In one aspect, the display device may also be deployed in other applications besides navigation, communication, and entertainment system of a vehicle, such as in aircrafts and/or home entertainment systems.

FIG. 1 illustrates an example of a display device 100. The display device 100 may include a display unit 130 provided with a display cabinet. Display unit 130 may be positioned together with a main circuitry 120 between a back cover 110 and a bezel 140 forming an outer housing. The outer housing 110, 140 may include means for positioning and fixing of the entire device within a target location.

Figure 2:
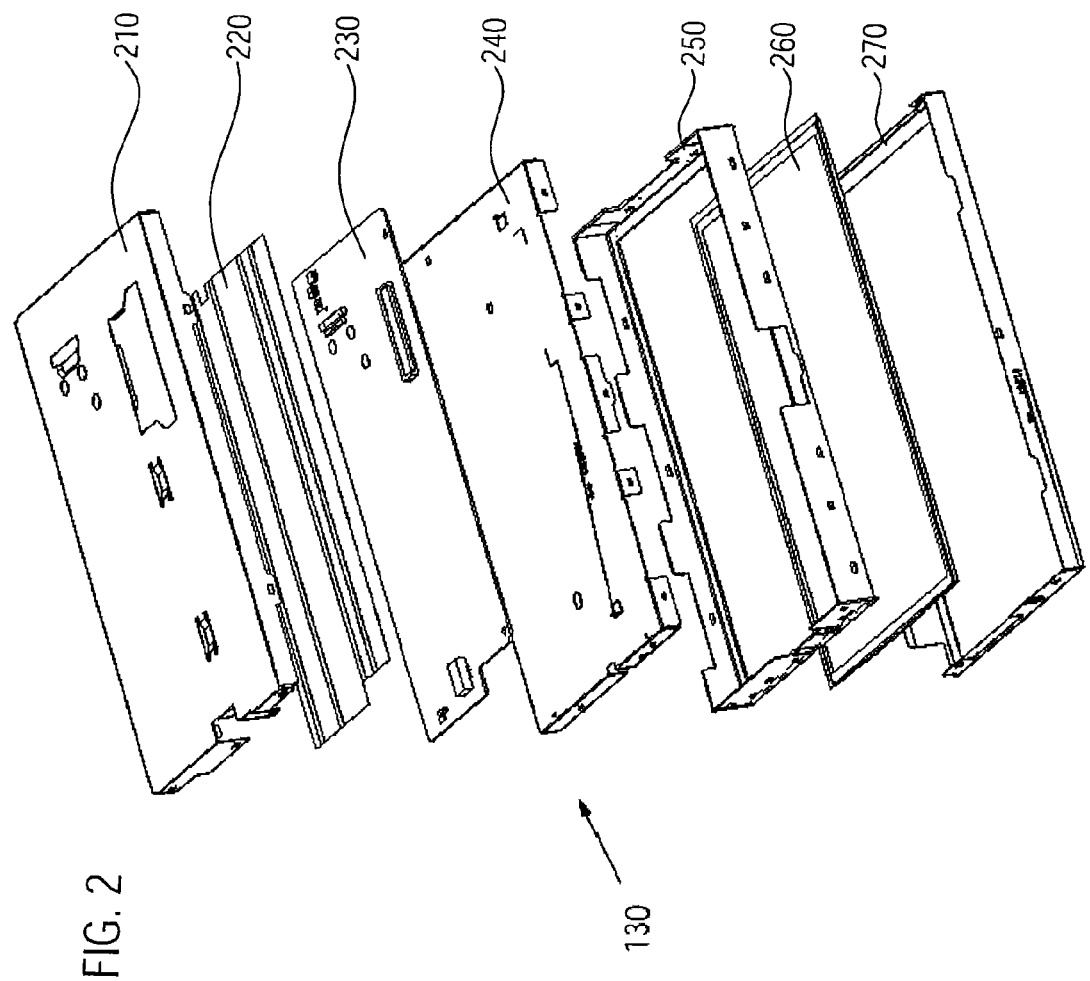
FIG. 2 is an exploded perspective view of components of another example of a display device.

FIG. 2 shows an example of basic components of the display unit 130 and the display cabinet. A display back cover 210 and a display bezel 270 may form parts of the display cabinet. A display 260 such as a liquid crystal display may be placed within the bezel 270. A display circuitry 230 such as a LCD may be insulated from the display back cover 210 by an insulation foil 220. The display circuitry 230 may be coupled to the main board 120. The display unit may include a separate, independent backlight system (not shown) that may include a backlight circuitry, which may also be coupled to the main board 120. A frame 250 with an aperture may be included with a shielding 240 within the frame 250. The backlight system may be implemented, for instance, by a cathode light or by a plurality of LEDs mounted on a heat and/or electro-conductive stripe.

Figure 3:
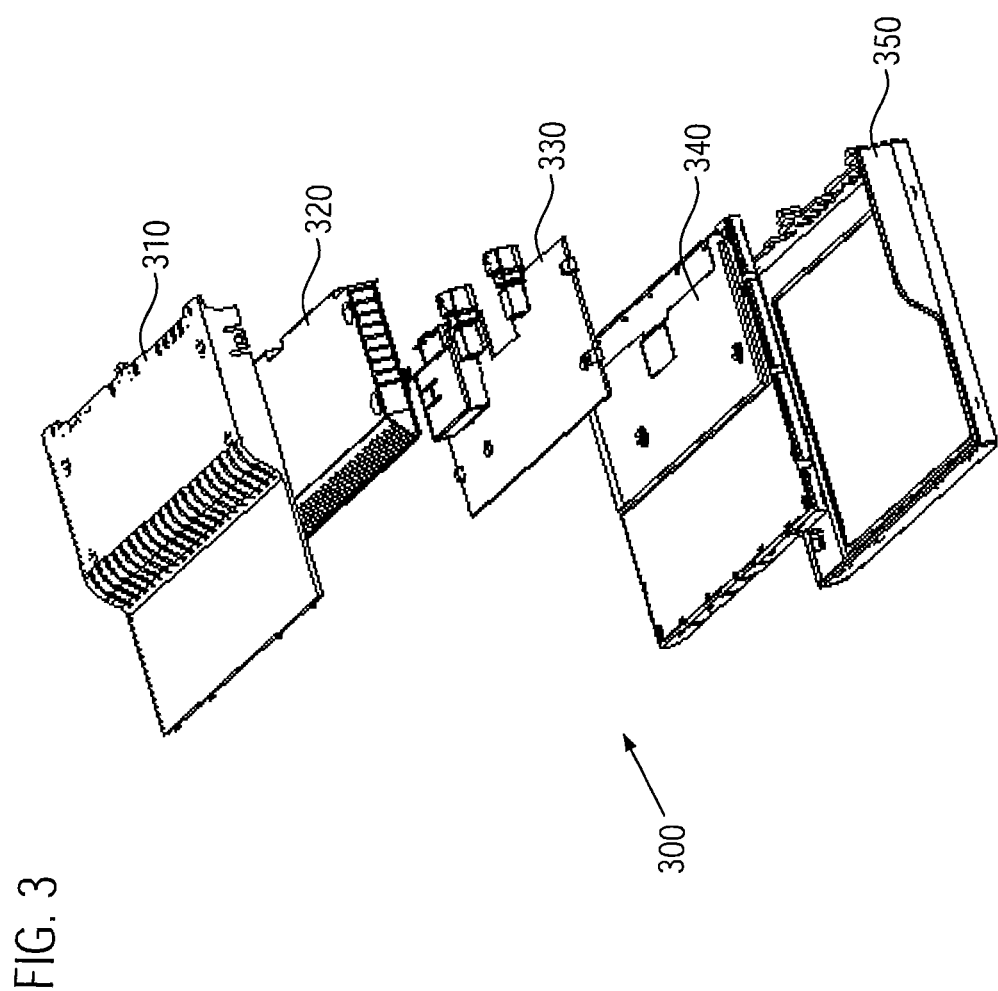
FIG. 3 is an exploded perspective view of components of yet another example of a display device.

FIG. 3 is an exploded perspective view of another example of a display device 300. A display cabinet housing may be formed by a display back cover 310 and the bezel 350. The display cabinet housing may encase an integrated liquid crystal display and backlight unit 340, an electronic circuitry 330, a shielding 320, or any combination thereof. The electronic circuitry 330 may be, for instance, a printed circuit board implementing the function of at least one of driving the display and the backlight, controlling the display and the backlight, providing a graphical interface, and providing intelligence to the display device.

Figure 4:
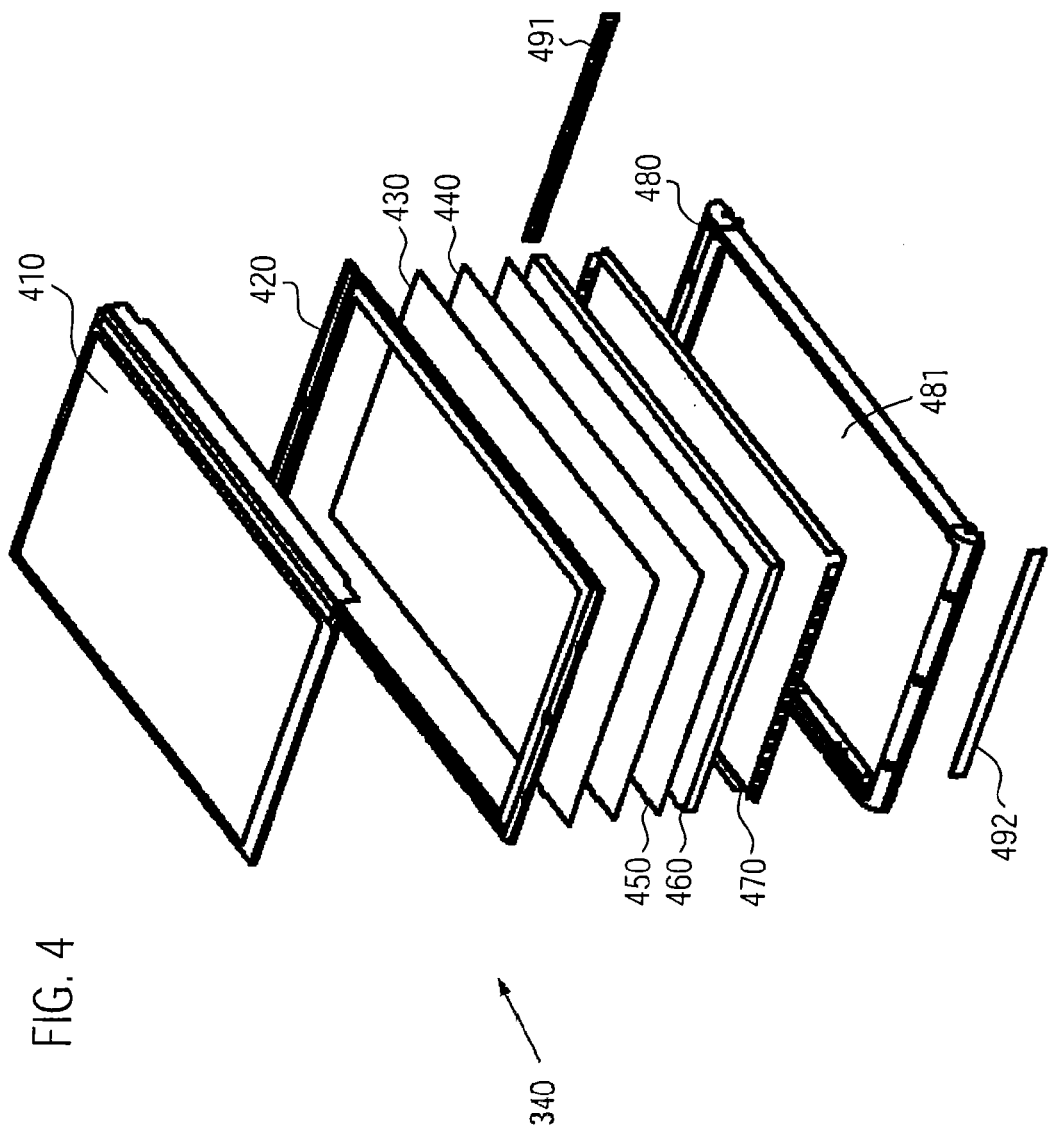
FIG. 4 is an exploded perspective view of example components of an integrated liquid crystal display and backlight unit of a display device.

FIG. 4 shows parts of the integrated LCD and backlight unit 340. LCD 410 may be positioned within LCD frame 420 such as on a first face of the frame, followed by one or more of the following: Dual-Brightness-Enhancement Foil (DBEF) 430, Brightness Enhancement Foil (BEF) 440, diffusion foil 450, Light Guide Plate (LGP) 460, and Enhanced Specular Reflector film or foil (ESR) 470. A backlight cover 480 may form a cover of the integrated LCD and backlight unit 340. The backlight light-emitting elements 491 and 492 may be mounted on a heat sink printed circuit board (PCB) or a flexible circuit board, and may be positioned on opposite edges, such as the first and the second sides, of the LCD and backlight unit 340 within the backlight cover 480. The LCD 410 may be any LCD known in the art. In one example, the LCD is an LCD with an active matrix of thin-film transistors (TFTs) to provide quicker response times and better image quality than passive matrix displays. The LCD frame 420 may be formed to enclose the backlight cover 480.

The backlight cover may facilitate dissipation of heat produced by the light-emitting elements 491, 492 and/or LCD 410. The backlight cover 480 may be made of a heat conducting material and may have a first face 481 to cover the heat source. The first face 481 may also cover the entire area of the display. This arrangement may allow efficient distribution and dissipation of heat generated by the light-emitting elements 491, 492 and/or LCD 410. The backlight cover 480 may also receive in a stacked arrangement one or more of the liquid crystal display and backlight unit parts, such as foils, the light emitting-elements 491, 492 and the liquid crystal display 410 located within the frame 420.

Figure 5:
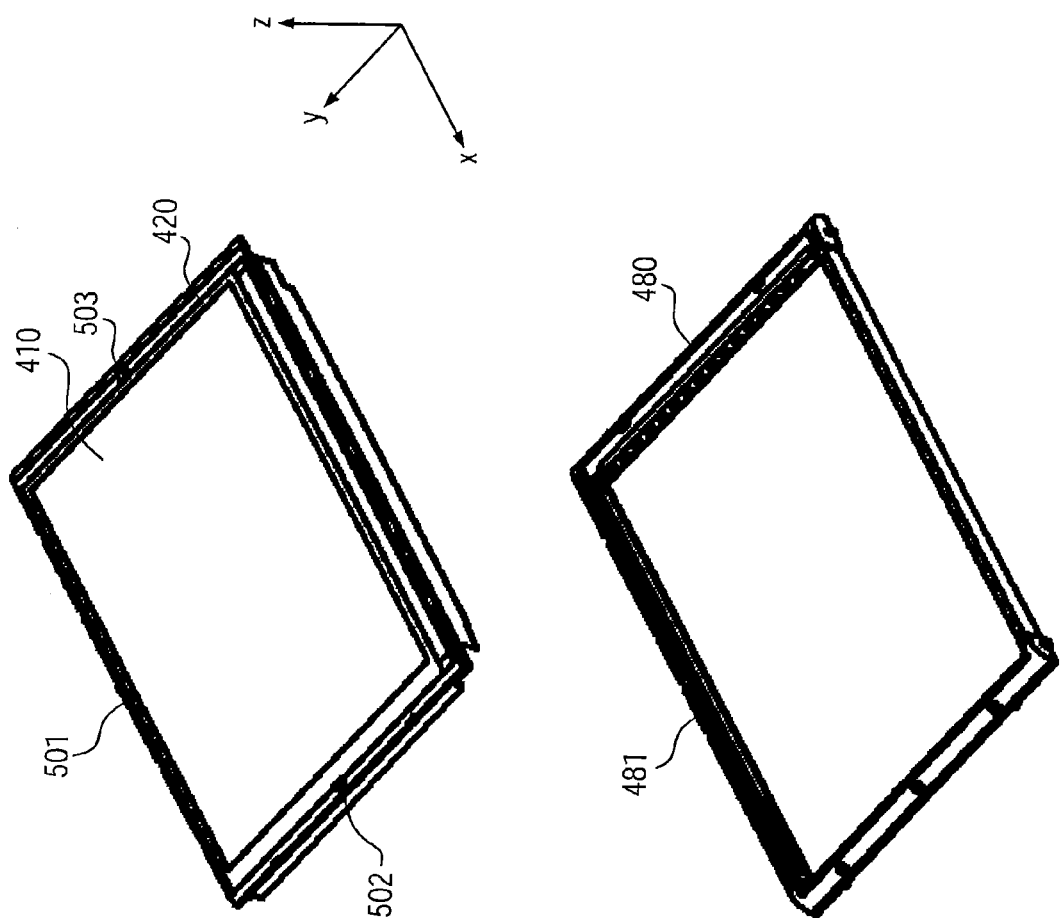
FIG. 5 is an exploded perspective view of an LCD frame with an LCD and a backlight unit frame of the display device of FIG. 4.

FIG. 5 illustrates the liquid crystal display 410 fixed in the liquid crystal display frame 420. The liquid crystal display frame 420 may be made of a low durometer material such as plastic in order to soften positioning of the LCD within the display device. The LCD 410 may be fixed to the LCD frame 420 for instance by a glue. The LCD frame 420 may include fasteners, such as pins 501, 502, and 503 for alignment of the display 410 that is fixed within the display unit. The pin 501 may be for alignment in the x-direction of display 410 with respect to frame 420, and the pins 502 and 503 may be for alignment in the y-direction. The pins enable the viewing area of the LCD 410 that is fixed to the LCD frame 420 to be pre-aligned to a centered position. The centered position may be rearward with respect to the backlight cover 480 in the x-direction and y-direction. This arrangement may reduce the positioning uncertainty and shorten the tolerance chain from the components. The backlight cover 480 may have corresponding centering means, for instance, slots configured to engage the pins 501, 502, 503. In the z-direction, the backlight cover 480 may be higher than the liquid crystal display 410. The backlight cover 480 may have a surface for adjusting in the z-direction. The backlight cover 480 may be made of a thermally conductive rigid material such as a diecast material, which may facilitate housing (cabinet) of the display device, cooling of the backlight and LCD, and shielding of the electronic assembly. In one example, backlight cover 480 is made from aluminum diecast, which may improve thermal management of the integrated LCD and backlight unit. The liquid crystal display frame may be made of a thermal conductive material to facilitate heat dissipation of the LCD to the backlight cover.

However, the liquid crystal display 410 may be also positioned within the display unit without the frame 420, for instance, if LCD is locked by fixing elements within the housing. Such fixing elements may be made of a softer material such as a plastic in order not to damage the LCD glass. On opposite sides, such as the first and second sides, light emitting element 490, 491 may be provided on strips (FIG. 7) such as metal strips that may be fixed onto the backlight cover 480 by welding, soldering, gluing, or other bonding techniques.

In one example, the light-emitting elements 491, 492 may include a larger number of low powered LEDs instead of fewer high powered LEDs that have specially configured LED housings to give better light conformity. Furthermore, low powered LEDs can enable easier change of LED power levels, if necessary.

The backlight cover 480 may further include an assembly feature for mounting behind a front panel. Such a construction may require no special mechanical parts for placing the display unit into a target location. In this manner, the integrated LCD and backlight unit 340 may be directly integrated in the housing for mounting to a target location. The liquid crystal display 410 may be aligned with respect to the backlight cover 480 and with respect to the target position, to allow more exact positioning of the display device in the target location.

Figure 6:
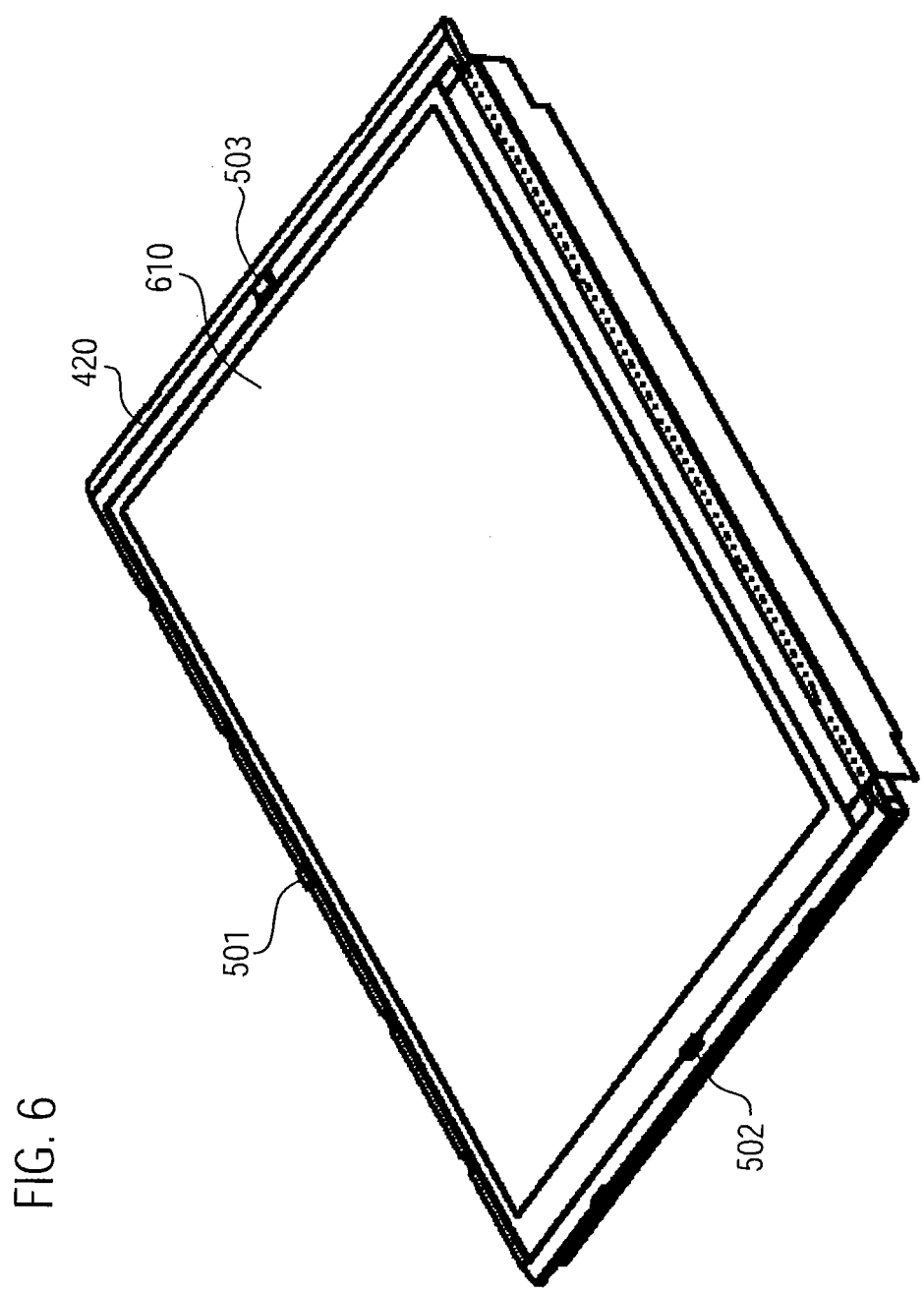
FIG. 6 is a perspective view of an example of the LCD frame with the LCD of FIG. 5 including pins for positioning.

FIG. 6 shows an example of the LCD frame 420, in which the viewing area 610 is pre-aligned in respect to the pins 501, 502 and 503.

Figure 7:
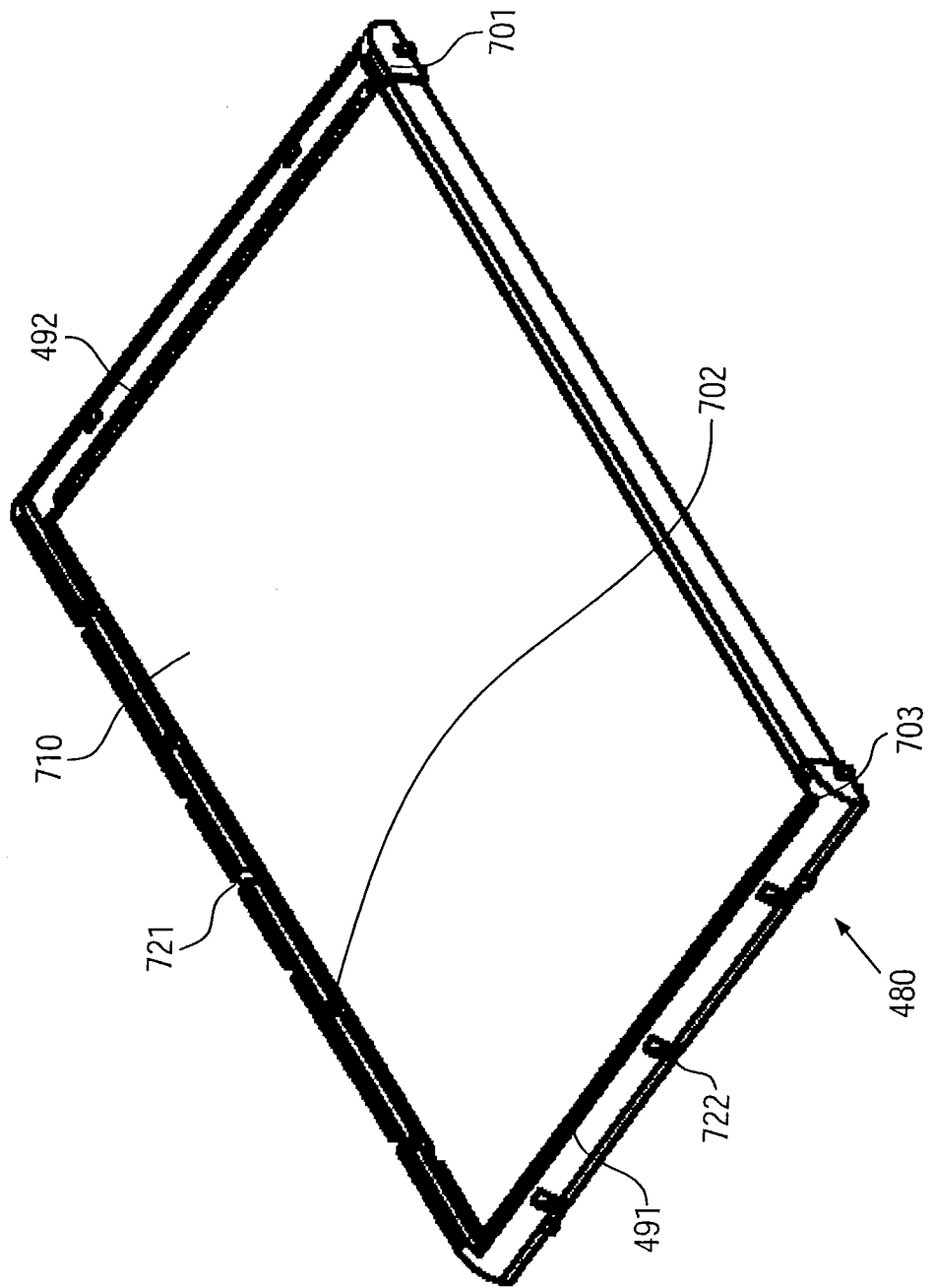
FIG. 7 is a perspective view of the backlight unit of FIGS. 4, 5 and 6.
Figure 8:
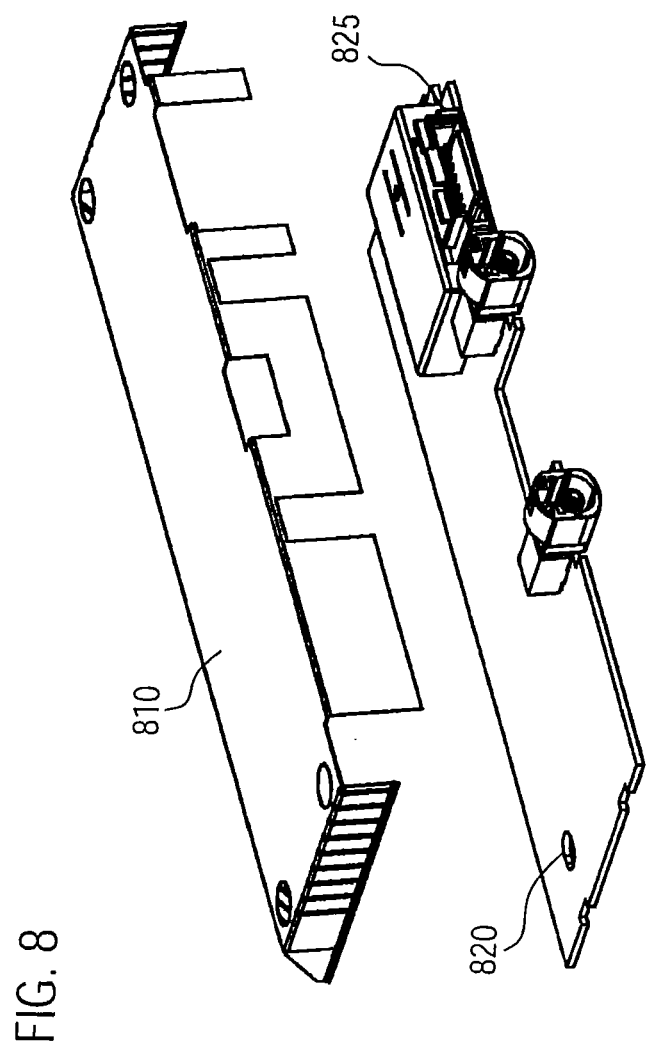
FIG. 8 is an exploded perspective view of an example of a shielding and a printed circuit board of a display device.

FIG. 7 shows an example of the backlight cover 480, in which a number of foils 710 are assembled. Protrusions 701, 702 and 703 serve for alignment in the z-direction. Holes 721 and 722 may be provided to engage pins 501 and 502 of the LCD frame 420 respectively, and to pre-align the position of the LCD 410 together with the LCD frame 420 in respect to the backlight cover 480. Pins 501 and 502 and holes 721 and 722 are only an example of corresponding engaging means. However, any other corresponding centering means for aligning the LCD 420 within the backlight cover 480 may also be provided on either of the LCD frame 410 and/or the backlight cover 480. The centering means may be in the form of fasteners, such as holes, slots, pins, notches, or protrusions, FIG. 8 illustrates an example of an assembly printed board circuit 820 with a shielding connector 825 and a shielding member 810. The assembly PC board 820 may integrate various functions such as display and backlight driving, graphical interface, and/or other control mechanisms necessary for the display target functions. The display and backlight driving may include instructions such as a voltage conversion and generation, time basis, and other driving information. The graphical interface may include control of the image input to be displayed. The control mechanisms may further include detection and handling of overvoltage, too low voltage, temperature management, controlling the light-emitting elements, on/off control, and other control mechanisms. Furthermore, the display device may include intelligence, for instance, by including a processing unit implemented on a processor, a programmable hardware controller, microcontroller, or any other logic based device. This added intelligence may control, for instance, the display of image or video signal from multiple image sources such as a back-up camera, a navigation system, a communication system, or an entertainment system. The display device may also handle format (for instance spatial resolution, frame rate, interlacing/progressive) conversions and/or displaying and controlling menus, or any other functions. Alternatively, the intelligence may be placed outside the display device in a central control unit and the display electronic circuitry may only perform simple functions such as display and backlight driving. In FIG. 3, the display device includes a single assembly board 330 for controlling the LCD and the backlight. On the other hand, FIG. 1 includes a separate main board 120 outside the display device 130, and FIG. 2 depicts the display device with a separate display controller 230 to be coupled to the main board 120. Providing a single assembly board 330 for the display device may reduce the size of the display compared with a solution with the LCD board 230 and the main board 120 separated from one another.

Figure 9B:
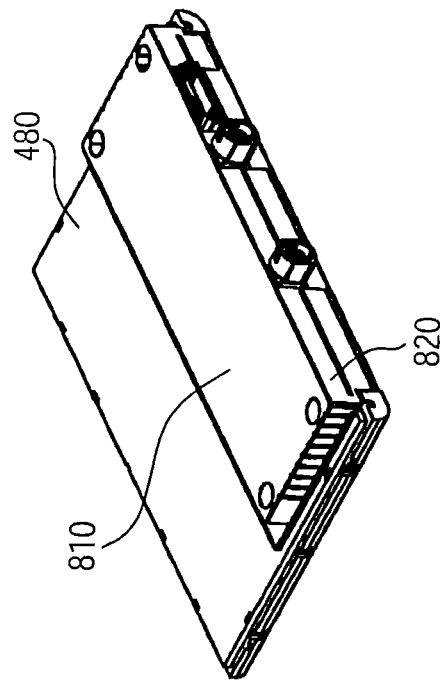
FIG. 9B is a rear perspective view of the display device without a cabinet housing of FIG. 9A.
Figure 9A:
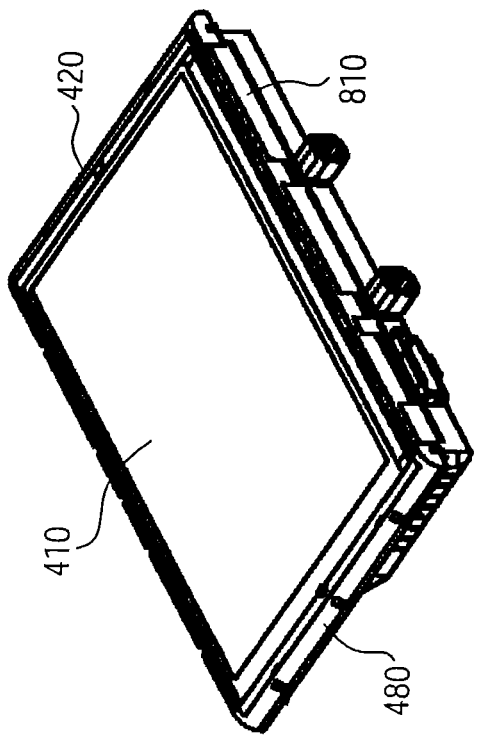
FIG. 9A is a front perspective view of an example of a display device without a cabinet housing.

FIGS. 9A and 9B show an example of the previously described components in an assembled state. In a front view, FIG. 9A illustrates a first face such as the front face of the display device. The display device may include the liquid crystal display 410 within the LCD frame 420, the backlight cover 480 which includes LCD frame 420 together with at least some of the foils and the backlight LEDs described with reference to FIG. 4 (not visible in FIG. 9A), and the shielding member 810.

FIG. 9B shows a second face of the display device, opposite the first face. The shielding 810 may be located on the second side of the backlight cover 480. The assembly printed circuit board 820 may be provided between the backlight cover and the shielding 810 to at least partially shield the board.

Figure 10:
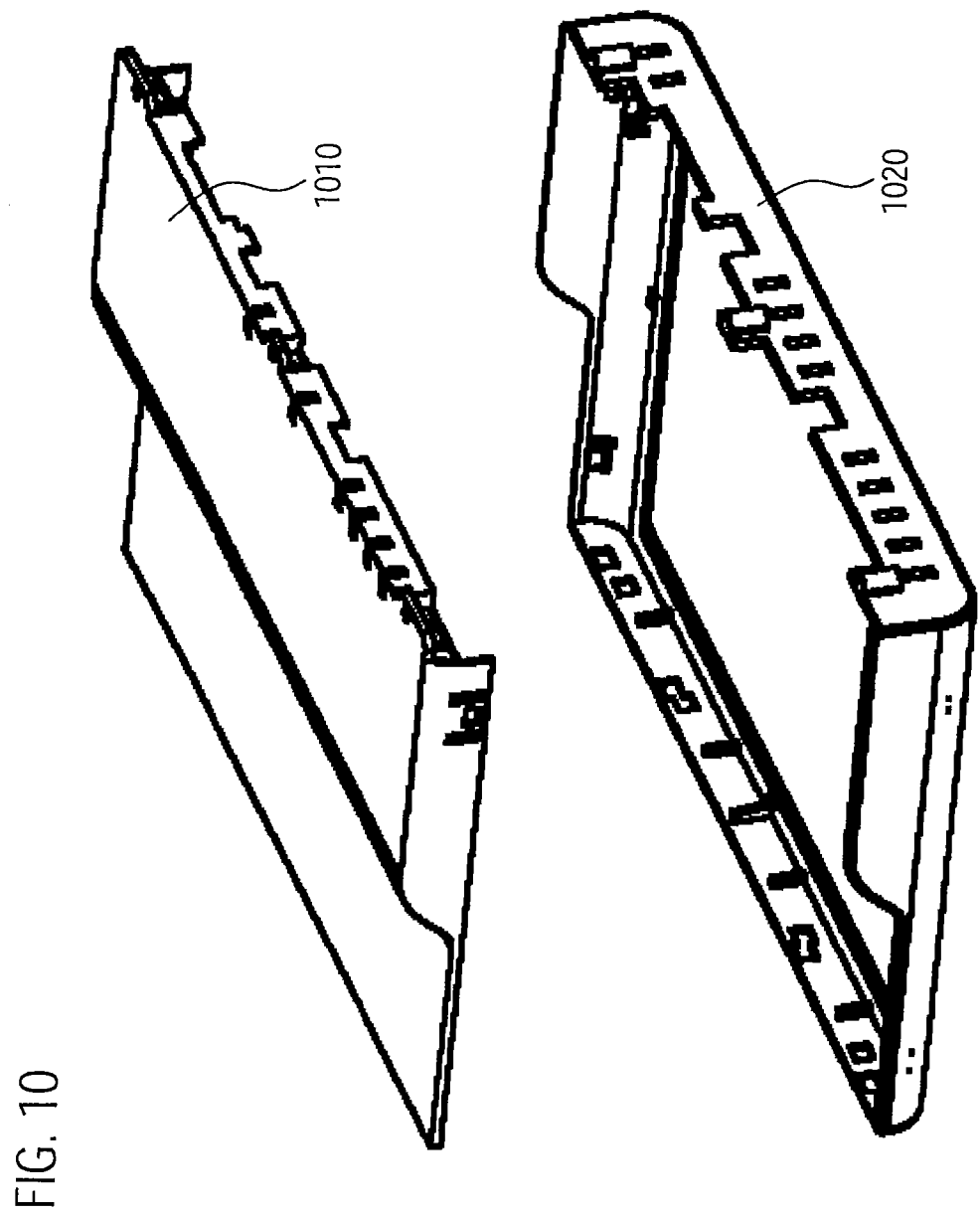
FIG. 10 is an exploded perspective view of front and rear parts of an example cabinet housing.

FIG. 10 illustrates two parts of an example cabinet housing of the display device. A first part 1020 may be formed as a bezel, and may be configured to engage a first face of the display device as shown in FIG. 9A. The second part 1010 may be a cover, which follows the general shape of the rear face of the display device shown in FIG. 9B that is formed by the surface of the shielding member 810 and a part of the backlight cover 480.

Figure 11:
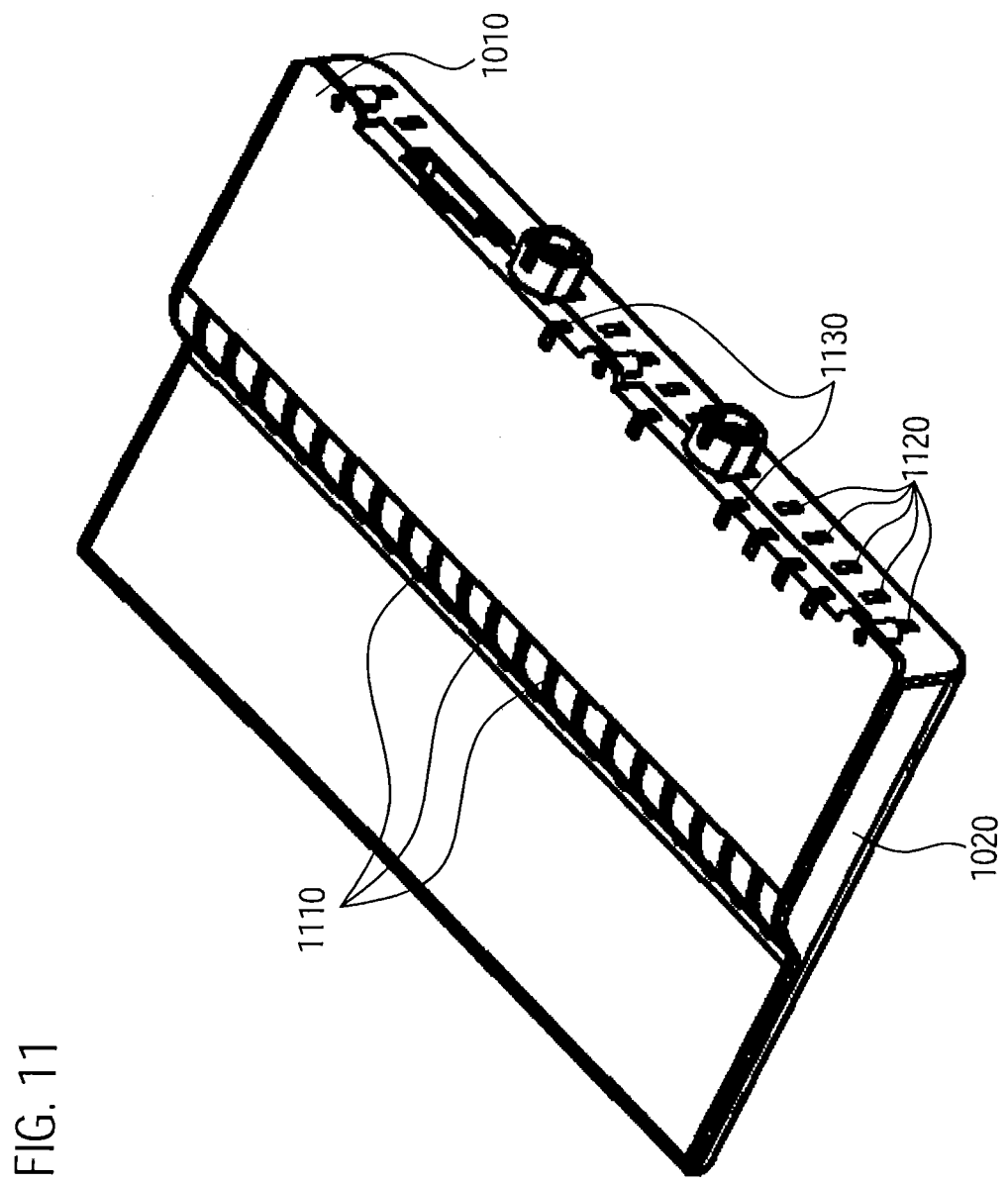
FIG. 11 is a rear perspective view of an assembled front and rear parts of the cabinet housing of FIG. 10.

FIG. 11 shows the cabinet housing of the display device of FIG. 10 in an assembled form. Cooling openings 1110, 1120, and 1130 may be formed in second face of the cabinet housing, in order to improve the cooling of the integrated LCD and backlight unit. In particular, openings 1110 and 1120 are positioned on the top and bottom sides of the rear part 1010 and the front part 1020 of the cabinet housing, respectively. In addition, the rear part 1010 of the cabinet housing may have openings 1130 located on the second side, in the vicinity of the cabinet housing border. The openings 1110, 1120, 1130 may allow for cooling of the backlight cover 480 and thus for dissipation of the heat produced by the backlight unit out of the cabinet housing. The cabinet housing may be made of metal, as well as other materials such as various kinds of plastics. The backlight cover may have a portion that extends to contact the second part so that the second part may aid in heat dissipation.

Figure 12:
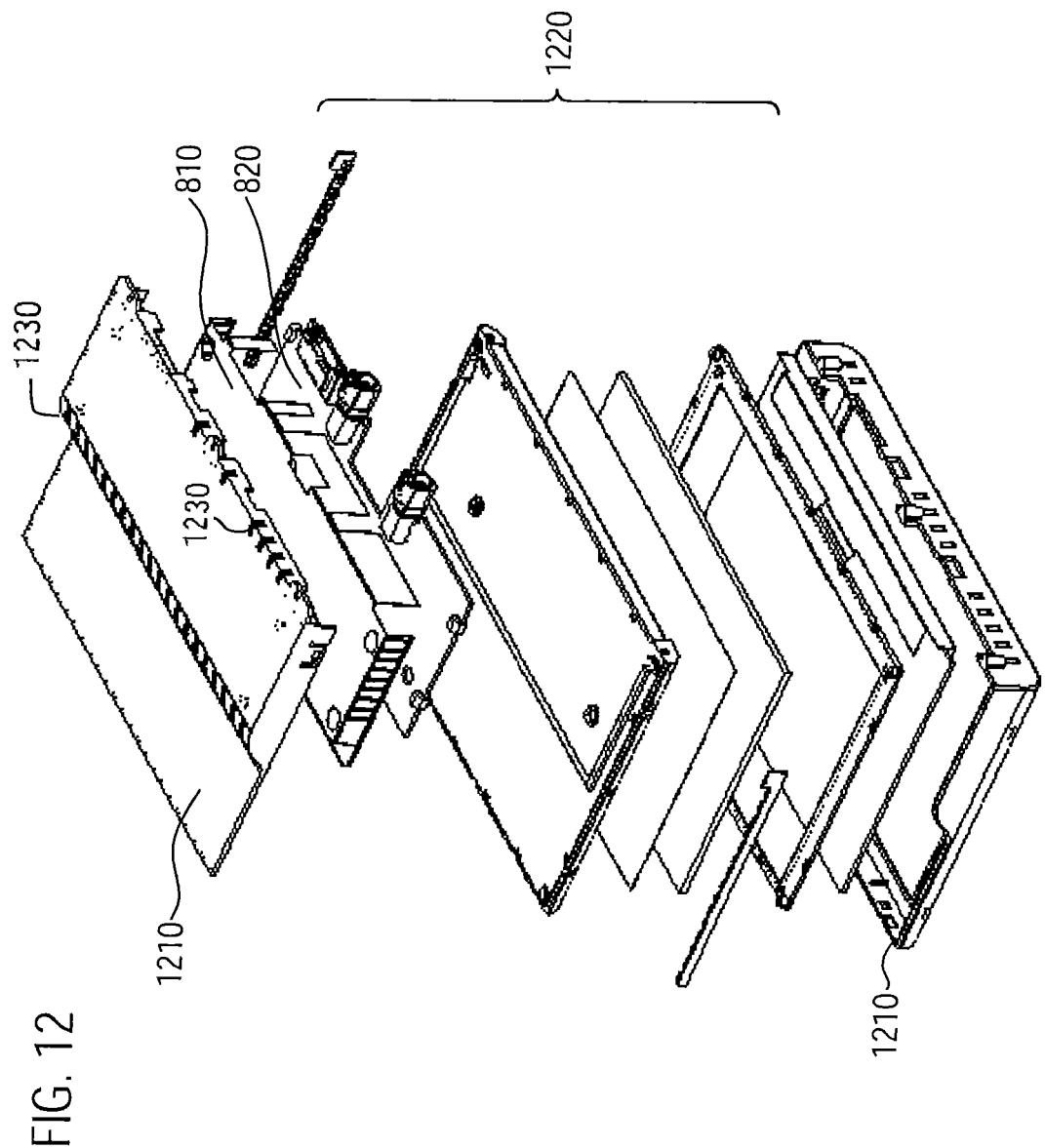
FIG. 12 is an exploded perspective view of an arrangement of an example display device.

FIG. 12 shows another arrangement of parts of an example display device. The three main parts are formed by the cabinet housing 1210 formed of front and rear parts as shown, for example, in FIG. 10; the shielding member 810 and PCB assembly 820 as shown, for example, in FIG. 8; and the integrated LCD and backlight unit 1220 as illustrated, for example, in FIG. 4. The entire backlight cover may serve for conducting the heat produced by the light-emitting elements and the openings 1230 in the cabinet housing 1210 allow for efficient cooling.

Figure 13A:
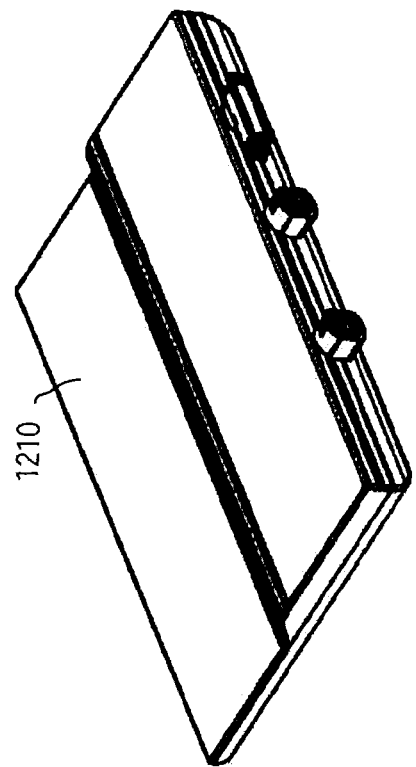
FIG. 13A is a rear perspective view of an example display device, depicting the shape of the rear side of the device without a cabinet housing.
Figure 13B:
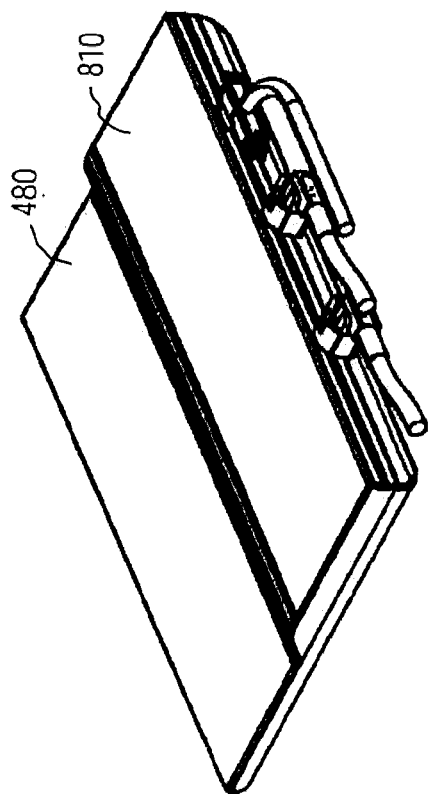
FIG. 13B is a rear perspective view of the display device of FIG. 13A with a cabinet housing.

FIG. 13A illustrates the outer shape of the components of an example display device, for example, the surface of the shielding 810 and a part of the backlight cover 480, to be encapsulated into the cabinet housing 1210, while FIG. 13B shows the cabinet housing 1210 encapsulating such components. FIG. 13A shows one example display device with a 20.3 cm (8-inch) LCD panel and without cabinet housing. Wiring for communications, power, and/or control may be provided at a single side, such as the bottom side of the device. FIG. 13B shows the cabinet housing 1210 configured for deployment in a vehicle, for example, may be 210 mm width, 130.5 mm height, 12.2 mm thickness along the top part, and 25 mm thickness along the bottom part.

The light-emitting elements may be positioned in various locations within the integrated LCD and backlight unit. In one example, the light-emitting elements 491, 492 may be positioned in a matrix adjacent the LCD 410 covering an entire area and directly irradiating the LCD 410. Such a backlight unit may be rather difficult to implement since the point sources of light arranged under the liquid crystal display are difficult to disassemble. Alternatively, the light-emitting elements may be positioned adjacent the LCD 410 along edges of the LCD to irradiate the LCD panel 410 with use of a light guide plate and a diffuser as shown, for instance, in FIGS. 4 and 12. Organic LEDs (OLEDs) may also be used as a uniform backlight system. OLEDs may be advantageous due the uniformity as well as thinness, which would allow for a very compact display device construction. Any of the backlight sources may be heat sources that may require efficient heat dissipation. The backlight cover 480 may provide efficient heat dissipation.

Figure 14A:
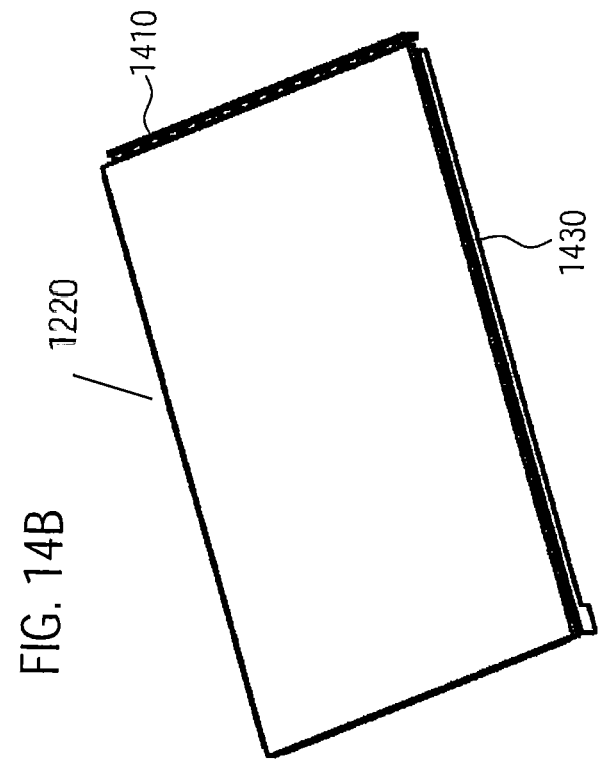
FIG. 14A is a schematic drawing of an example positioning of light-emitting elements along two opposite sides of a display device.

FIGS. 14A-14D show examples of positioning the light-emitting elements within the integrated LCD and backlight unit 1220. FIG. 14A illustrates light-emitting elements 1410, 1420 positioned on two opposite sides of the integrated LCD and backlight unit 1220. In particular, FIG. 14A shows positioning on a first side and on a second side, opposite to the first side, of the integrated LCD and backlight unit 1220. When the display is rectangular, the light emitting elements may be positioned along the short sides or the long sides of the integrated LCD and backlight unit 1220. The number of light-emitting elements on each side may be the same, which may depend on the size of the LCD to be backlighted. In one example, 16 LEDs on the first side and 16 LEDs on the second side may be employed to provide effective backlight for a vehicle display of 20.3 cm (8-inch) size.

Figure 14B:
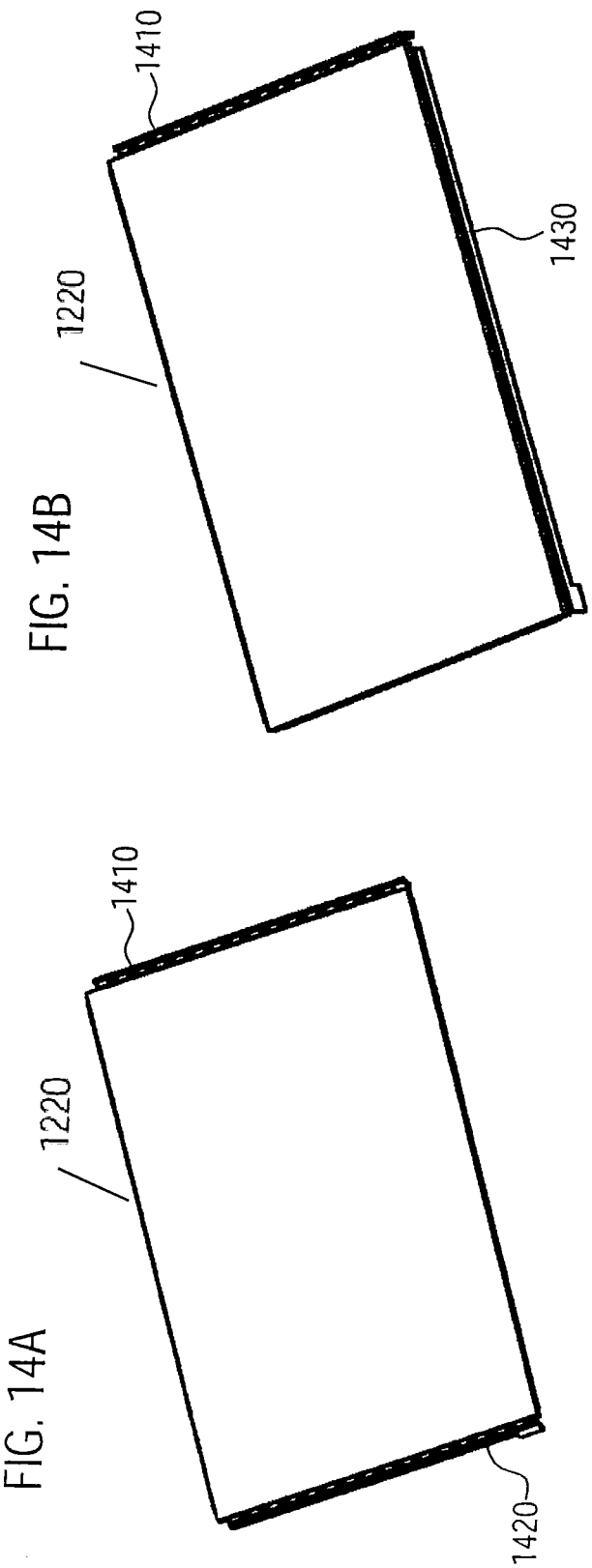
FIG. 14B is a schematic drawing of an example positioning of light-emitting elements along two neighboring sides of a display device.

FIG. 14B illustrates light-emitting elements 1410, 1430 positioned on the adjacent sides of the integrated LCD and backlight unit 1220. In particular, the light-emitting elements may be positioned on the second side and along a third side perpendicular to the second side of the integrated LCD and backlight unit 1220. However, any of two adjacent sides may be chosen for positioning the light-emitting elements. The number of light-emitting elements on the second side and on the third side of the integrated LCD and backlight unit 1220 may be determined similarly to the ratio of the lengths of the sides of the integrated LCD and backlight unit 1220. In one example, 16 LEDs on the second side and 24 LEDs on the longer third side may be employed.

FIG. 14C illustrates light-emitting elements 1430 positioned only along a single side or edge of the integrated LCD and backlight unit 1220. When the display does not include sides of equal lengths, a longer side may be chosen for placement of the light-emitting elements to allow for placement of a greater number light-emitting elements and for a more intensive backlighting. For instance, 24 LEDs may be employed along the third side, although the LEDs may be placed only on a shorter side.

Alternatively, the LEDs may be placed on three or all four sides of the integrated LCD and backlight unit 1220. FIG. 14D illustrates light-emitting elements 1410, 1420, and 1430 positioned on sides opposite to one another, and a side connecting the two opposite sides.

In general, the number of light-emitting elements per side may depend on the size of the LCD display, the light radiating properties of the light-emitting elements, and/or on the requirements of the target application. For instance, for an application in a vehicle, a backlight system for displays capable of providing a luminance of 600 cd/m$^2$ is desirable. In a vehicle, various different displays may be used having different sizes.

The particular positioning of the light-emitting elements may be selected according to the requirements of the display device deployment. From the point of view of a compact design, the configurations shown in FIGS. 14A, 14B and 14D may require the integrated LCD and backlight unit 1220 to include multiple sides sized to accommodate the size of the light-emitting elements. In a configuration with light-emitting elements placed only along one side, the size of the light-emitting elements may only influence the size of the one side of the integrated LCD and backlight unit 1220. Partial sides adjacent to the one side may have a form of a wedge-like shape. Consequently, larger sized light-emitting elements (possibly more powerful) may be employed along the one side, while keeping the remaining portions of the integrated LCD and backlight unit 1220 still compact.

One advantage of the configuration in FIG. 14A may be better thermal management. Since the light-emitting elements are placed on the shorter opposite sides, the heat may be better distributed and dissipated more uniformly across the backlight cover 480. The configurations shown in FIGS. 14B-14D include the light-emitting elements on a longer side. One of the sides may include a flexible cable printed circuit board stripe, which may increase the heat generated and may make the heat distribution more difficult. The design of the light guide plate in terms of uniformity may be simpler for the configurations in FIGS. 14A and 14C and more difficult in FIGS. 14B and 14D. This difficulty may arise since the dispersion of light in two main directions, orthogonal to each other, which has to be taken into account for the light guiding plate design. A light guiding plate typically diffuses the light through a series of prisms or diffusers, the density of which increases with the distance from the light source according to a diffusion equation.

Figure 15:
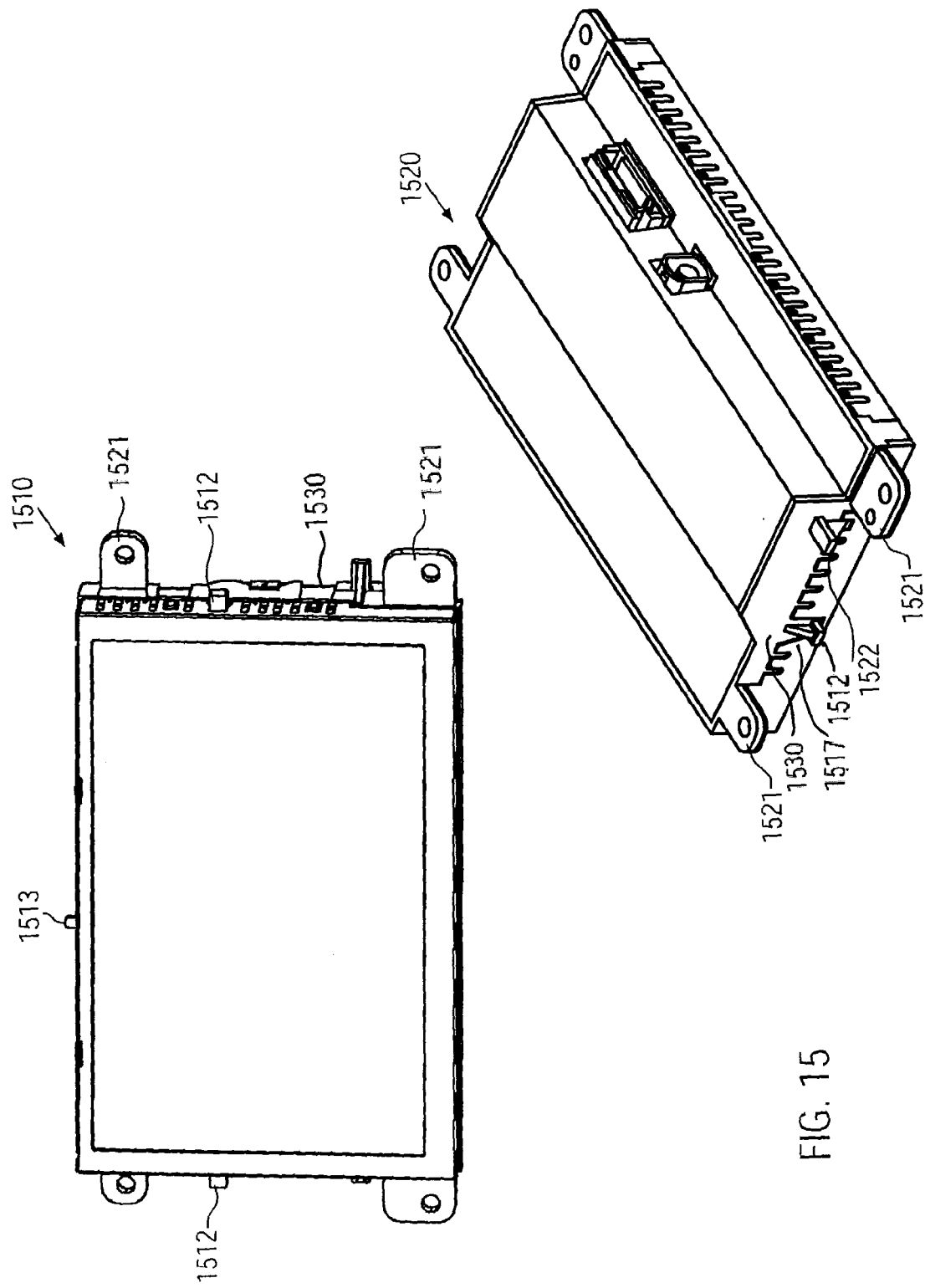
FIG. 15 is a front view and a rear perspective view of an example display device with a cabinet housing.

FIG. 15 shows another example of a first face 1510 such as a front face and a second face 1520 such as a rear face of a cabinet housing for the display device. In this example, a backlight cover 1530 may form an integral part of the cabinet housing and be used for assembling the components of the display device. The backlight cover 1530 may include on one or more sides mounting protrusions 1521 for fixing the display device on a target location, for instance, on a dashboard of a vehicle. The first face 1510 of the cabinet housing may also include mounting protrusions for fixing of the display device in a target location. Providing the mounting protrusions 1521 as a part of the backlight cover 1530 may increase the stability of the mounted display device and facilitate alignment of the display device to the target position. The alignment of the display device may be independent from the fitting of the cabinet housing. The display device may be fixed to the target position using the mounting protrusions 1521, for instance, by fasteners such as a screw or a rivet and/or by gluing or welding.

The first face 1510 of the cabinet housing may also include mounting protrusions 1511 (also shown in FIG. 17) for coupling the first face 1510 to the backlight cover 1530. The mounting protrusions 1511 may be hingedly attached to the first face 1510 for flexibility and may include a tine or be angled outwardly at the outer end of the mounting protrusion 1511. The mounting protrusions 1511 may be coupled with openings or slots 1515 (shown in FIG. 17) formed in the backlight cover 1530 for a snap fit. The mounting protrusions 1511 may have an opening formed in the body of the mounting protrusion 1511 for receiving an outward protrusion located on the backlight cover. When coupled, the backlight cover 1530 and the cabinet housing first face 1510 may provide a more exact positioning of the display device.

Centering mechanisms 1512, 1513 or 1522 formed on the cabinet housing first face 1510 and/or the backlight cover 1530 may be provided for aligning the position of the display device and/or for coupling (locking) to a target location. The centering mechanism 1512 such as protrusions may be placed on opposite first and second sides of the backlight cover 1530 to provide a first centering function of the display device, such as a vertical centering function. The centering mechanism 1513 such as protrusion(s) may be formed on one or more opposite third and fourth sides, perpendicular to the first and second sides, of the backlight cover 1530 to provide a second centering function of the display device, such as a horizontal centering function. The centering mechanisms 1512, 1513, or 1522 may be any shape such as block shape and may further have a gusset for added support. The first face 1510 may include centering slots 1517 for receiving the centering mechanisms 1512 or 1513. Slots 1517 may be dimensioned wide at the base, and tapered inward from the base to a smaller dimension to snugly receive the cross-section of a corresponding centering protrusion. In one example, the slot 1517 is formed three-sided which may include a rectangular end opening for receiving and contiguously contacting around a rectangular cross-section of the center protrusion 1512, 1513. The protrusions 1512, 1513, or separate protrusions such as 1522, may also serve for adjusting an appropriate depth in a z-direction of the display device within the target location. The centering mechanisms 1512, 1513 or 1522 may also provide a centering function for the display frame such that the display frame and the first cover can be centered with respect to the backlight cover.

The backlight cover 1530 may include mounting means 1521 for mounting the display device into a target location, centering means 1512, 1513, 1522 for centering the display device within the target location, and centering means, such as protrusions 701, 702, and/or 703, for centering internal parts of the display device. This arrangement may provide the liquid crystal display an advantage of accurate positioning of the display device, which may be important for vehicle applications. In addition, the backlight cover 1530 may serve as the primary mechanical support and housing of the display device. The single backlight cover 1530 may further provide efficient heat dissipation and electromagnetic shielding.

Figure 16:
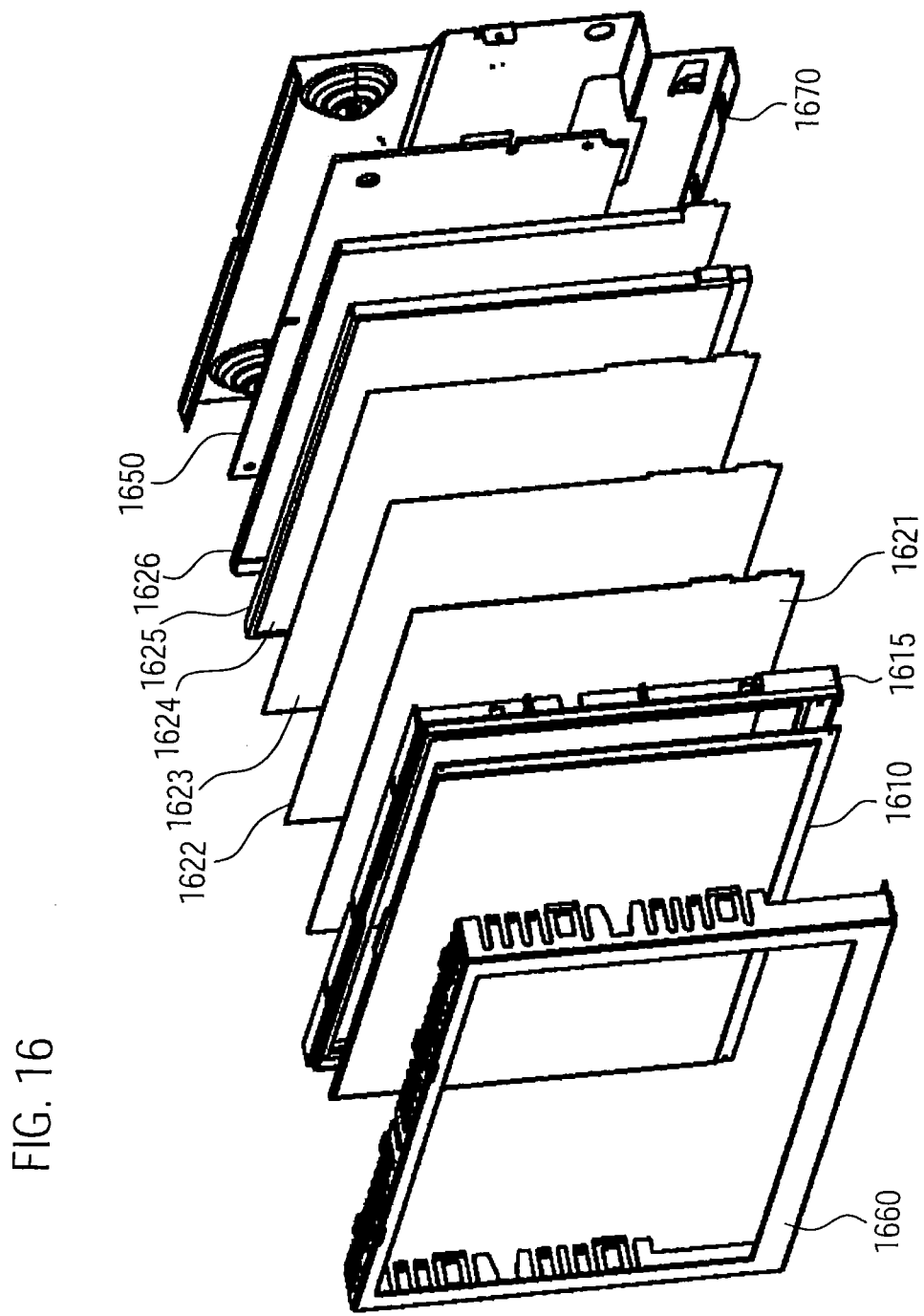
FIG. 16 is an exploded perspective view of the display device with cabinet housing as illustrated in FIG. 15.

FIG. 16 illustrates parts of the display device assembled in the cabinet housing shown in FIG. 15 without the backlight cover 1530. The first face of the cabinet housing 1510 may be formed by a front bezel 1660. The second face of the cabinet housing may be formed by the second cover 1670. A LCD 1610, such as a TF7, may be located within an LCD frame 1615. In addition, the polarization foil 1621, dual brightness-enhancement foil 1622, brightness enhancement foil 1623, diffuser 1624, light guide plate 1625, and reflector 1626 may be included in the integrated LCD and backlight unit in the backlight cover 1640 (shown in FIG. 17). The electronics 1650 may include display device driving circuitry and display device control circuitry and may be located between the backlight cover 1640 and the second cover 1670. The backlight cover 1640 may separate the electronic circuitry 1650 from the rest of the display device and may act as an electromagnetic shield. In addition, the backlight cover 1640 may form an integral part of the cabinet housing and enable the positioning of the entire display device within a target location. The heat conducting properties of the backlight cover 1640 may enable dissipation of heat produced in the integrated LCD and backlight unit. The second cover 1670 may be made of metal in order to provide shielding for the electronic circuitry 1650 from the side opposite to the shielding formed by the backlight cover 1640.

Figure 17:
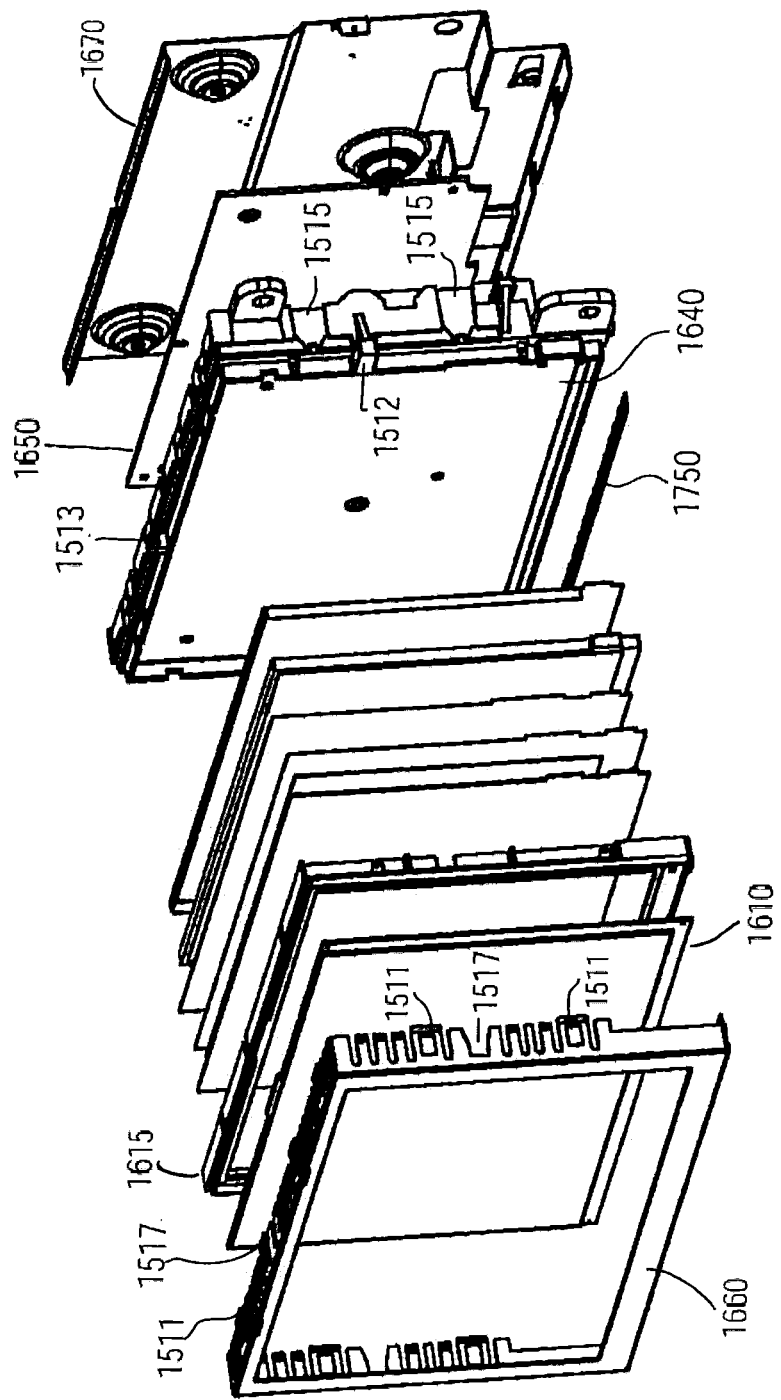
FIG. 17 is an exploded perspective view of the display device with cabinet housing and a backlight cover as illustrated in FIG. 15, depicting the position of the light-emitting elements within the display device.

FIG. 17 shows parts of an example display device similar to the parts of the display device of FIG. 16 with the backlight cover 1640. Backlight-providing light-emitting elements 1750 are in this example located on the bottom side of the LCD screen 1610. The backlight cover 1640 may include edges that enclose the electronic circuitry 1650 from multiple sides so that the backlight cover may provide the electromagnetic shield. The first cover 1660 and the second cover 1670 may include walls that couple directly to the backlight cover 1640.

Figure 18A:
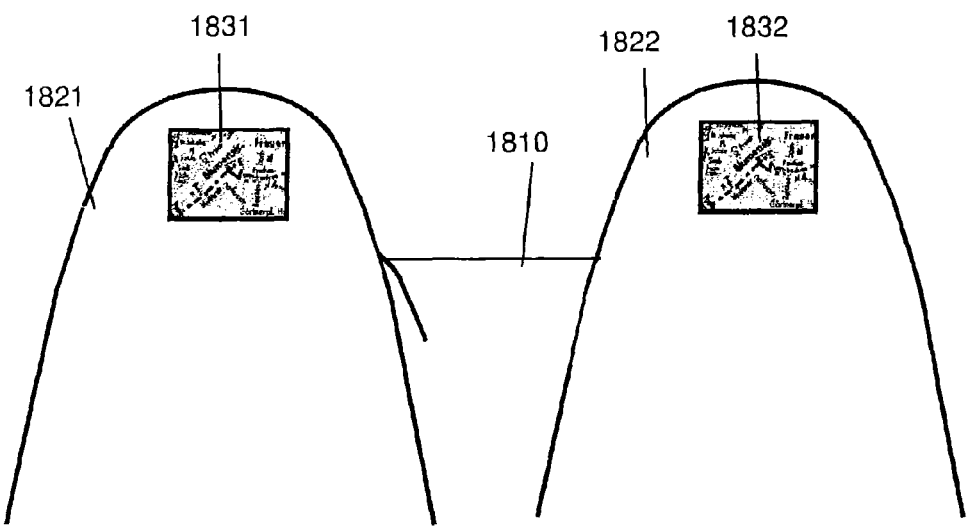
FIG. 18A is a schematic drawing illustrating an example of display positioning within a vehicle navigation, communication, and entertainment system.
Figure 18B:
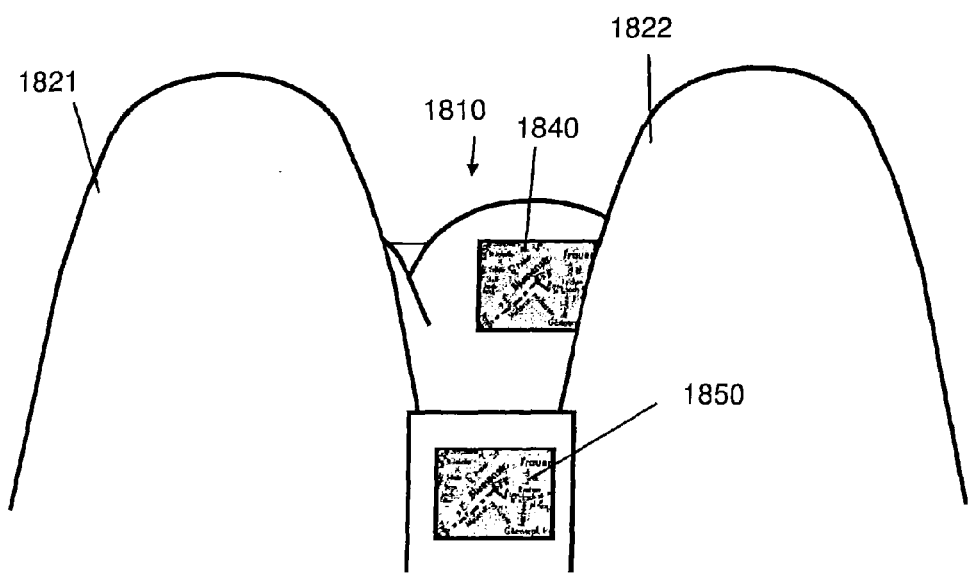
FIG. 18B is a schematic drawing illustrating another example of display positioning within a vehicle navigation, communication, and entertainment system.

FIGS. 18A and 18B illustrate two examples of target locations for a plurality of displays in a vehicle. The configurations take the rear-seat passengers into account. In FIG. 18A, the individual display devices 1831 and 1832 may be mounted on the back side of the front-seats 1821 and 1822. In other examples, the display devices may be mounted in any other location that may be perceived by a user in a front or rear seat of a vehicle. Both display devices 1831 and 1832 may display individual image signals, for instance, different video entertainment signals supplied by a DVD player or a vehicle TV receiver, vehicle information signals provided by the vehicle navigation system, data communication system, or any combination thereof. The display configuration of FIG. 18B differs from the arrangement shown in FIG. 18A in that the rear-seat passengers have a single display device 1850, whereas at least one other display device 1840 may be mounted on the vehicle such as the dashboard 1810. Other configurations of displays in a vehicle navigation, communication, and entertainment system may be adopted. For instance, displays of different sizes may be arranged in the driver's field of view (for instance directly on the instrument panel) and in the front-seat passenger's field of view in order to provide different amounts of information to the driver and to other passengers.

Figure 19A:
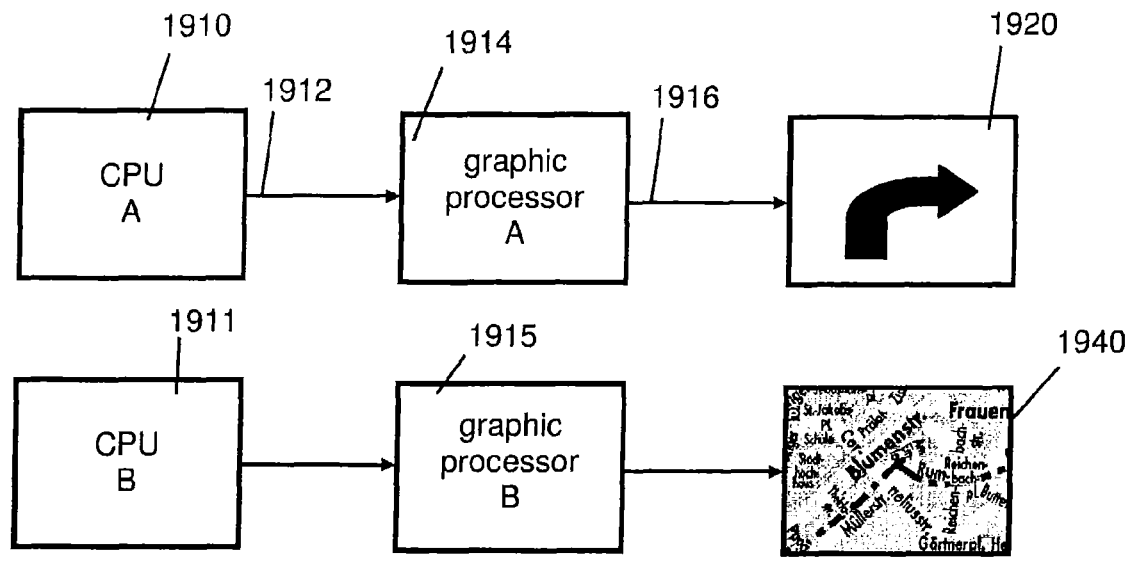
FIG. 19A illustrates an example of a navigation and/or entertainment system on board a vehicle with two display devices having separate control hardware.
Figure 19B:
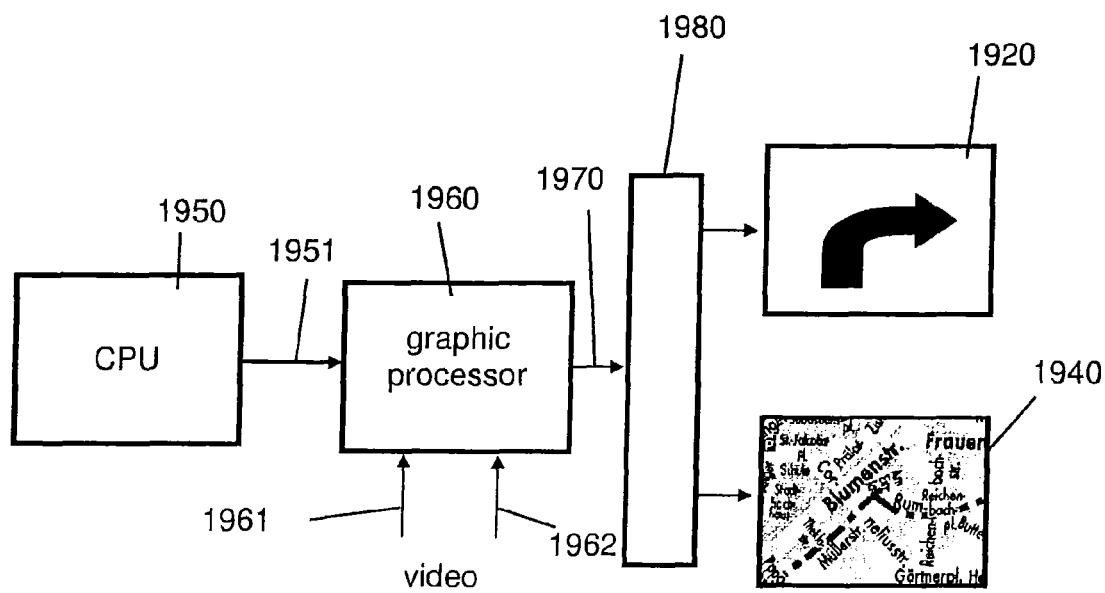
FIG. 19B illustrates another example of a navigation and/or entertainment system on board a vehicle with two display devices having shared control hardware.

FIGS. 19A and 19B schematically illustrate parts of an example navigation, communication, and entertainment system with two displays. FIG. 19A shows a navigation, communication, and entertainment system with two separate displays 1920 and 1940, in which the images on the two displays may be generated separately. For this purpose, individual image processing hardware may generate first image signals for the first display 1920 and additional or the same image processing hardware may generate second image signals for the second display 1940. A graphic processor 1914 may generate the images display signal 1916 for display on a first display device 1920. The operation of a first graphic processor 1914 may be controlled by image generation commands 1912 supplied by a first CPU 1910. CPU 1910 may perform preprocessing of the image data to be displayed and may provide the image content together with control information to the graphic processor 1914. In particular, the image display signal 1916 may be generated by taking the image content and control information from the CPU, such as the display resolution and the frame rate into account. For this purpose, the graphic processor 1914 may perform drawing operations such as rotating, zooming, and vector operations. The image data for the second display device 1940 may be generated by a second CPU 1911 and a second graphic processor 1915 in a corresponding manner FIG. 19B illustrates schematically another example configuration of the navigation, communication, and entertainment system. A CPU 1950 may generate image content and control information 1951 for two individual image signals. The image content and control information 1951 may be transmitted to a graphic processor 1960 for generating an image display signal 1970 based on the received information 1951. The image content and control information 1951 may include information for two separate images included within one image signal. Correspondingly, graphic processor 1960 may generate an image display input signal 1970 including image display information for two separate display devices 1920 and 1940.

Alternatively, graphic processor 1960 may receive additional image information 1961, 1962 from external sources. The single image display output signal 1970 may include a combination of any of the received image content informations 1951, 1961, 1962. In one example, the single image display input signal 1970 is made up of image information for two separate displays. Display devices 1920 and 1940 may have an image resolution of, for instance, 480×200 pixels or of 800×480 pixels, or any other resolution, depending on the target position. Such image sizes do not necessarily require the processing capacity provided by conventional graphic processors. The spare processing power may instead be employed for the generation of a combined single image display input signal 1970. Both displays 1920 and 1940 may have an equal size, or different sizes. If they have an equal size, the image generation by graphic processor 1960 may be accomplished in a simpler manner.

The single image display input signal 1970 may be supplied to an image display generator 1980 to generate two image display signals for the separate display devices 1920 and 1940. Image display generator 1980 may split the received single image display input signal 1970 into the separate image display signals. However, the graphic processor 1960 and the image generator 1980 may also be combined and the functions performed by a single processor.

Although the previous embodiments have been described with respect to the processing and display of two image display signals, a plurality of display devices may receive individual image display information from a signal image display input signal 1970.

However, the navigation, communication, and entertainment system may also include a single display 1920 only. The navigation, communication, and entertainment system according to FIG. 19B is a solution resulting in lower hardware costs and smaller size if a plurality of display devices is to be employed. In a vehicle both systems of FIGS. 19A and 19B may also be combined. The graphic processor may be included as a part of the electronic circuit assembly or provided separately.

Figure 21:
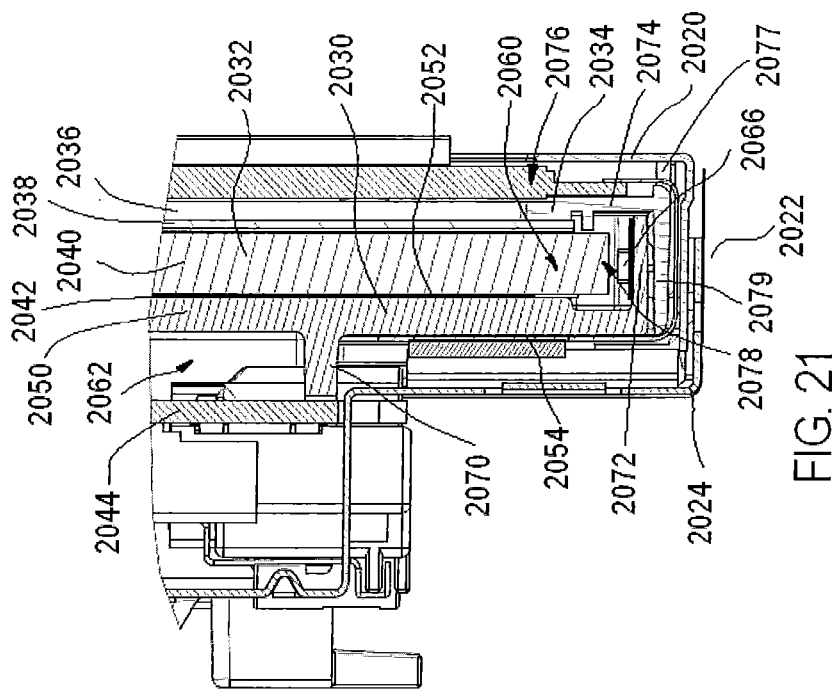
FIG. 21 is a magnified cross sectional view of a portion A of FIG. 20.
Figure 20:
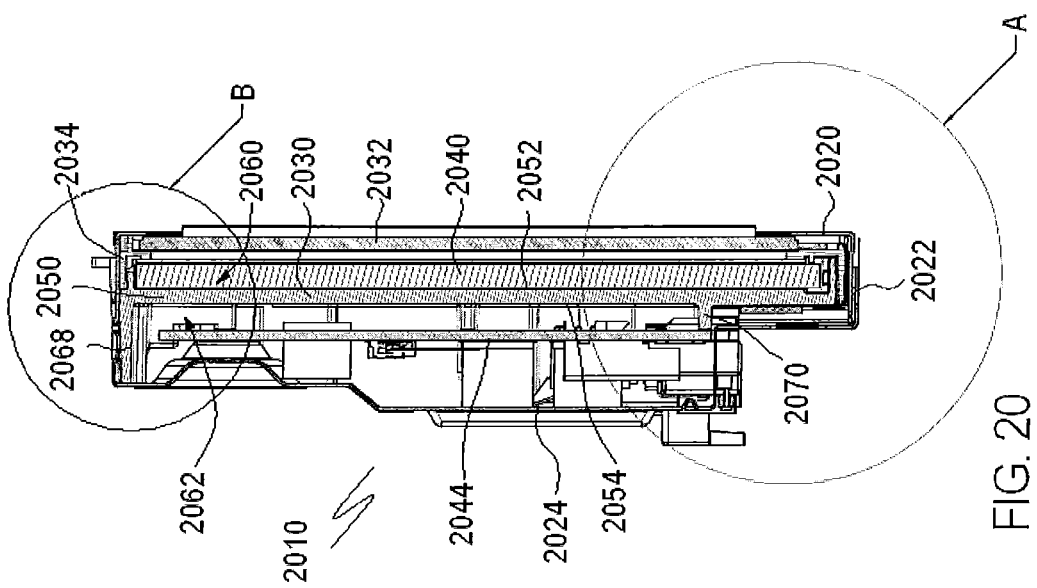
FIG. 20 is a cross sectional view of the display device in FIG. 15.

FIG. 20 is a cross section view of an example display device similar to the illustrated display device in FIG. 15, shown a reference numeral 2010. The first cover 2020, such as the front cover, of the cabinet housing 2022 and the second cover 2024, such as the rear cover, of the cabinet housing 2022 may be directly coupled to a backlight cover 2030. The backlight cover 2030 may provide the primary supporting structure and housing of the display device. A LCD 2032, such as a TF7, may be located within a display frame 2034. In FIG. 21, the backlight cover 2030 and the frame 2034 may be structured and arranged to house the one or more foils 2036, such as the polarization foil, dual brightness-enhancement foil, brightness enhancement foil, a diffuser 2038, a light guide plate 2040, and a reflector 2042. An electronic circuit assembly 2044, which may include the display device driving circuitry and display device control circuitry, may be located between the backlight cover 2030 and the second cover 2024. The backlight cover 2030 may separate the electronic circuit assembly 2044 from the rest of the display device and may act as electromagnetic shield, such as from the front and sides. The backlight cover 2030 may further form an integral part of the cabinet housing to enable the positioning of the entire display device within a target location. The heat conducting properties of the backlight cover 2030 may enable a dissipation of heat produced in the integrated LCD and backlight unit. The second cover 2024 may be made of metal in order to provide a shielding for the electronic circuit assembly 2044 from the opposite side, such as the rear, to the shielding formed by the backlight cover 2030.

The backlight cover 2030 may include a wall 2050 in the form of plate having a first face 2052 facing the LCD 2032 and a second face 2054 facing opposite to the LCD 2032. The wall 2050 may separate a first backlight enclosure 2060 and a second backlight enclosure 2062. The first backlight enclosure 2060 may include edges extending from the first face 2052 to cover the guide plate 2040 of the backlight-providing light-emitting elements 2066. Light-emitting elements 2066 may be located along a single side such as the bottom side, of the LCD 2032 and coupled to the first backlight enclosure 2060. The second backlight enclosure 2062 may also include edges extending from the second face 2054. The edges of the second backlight enclosure 2062 may include a first lip 2068 and a second lip 2070 extending from the second face 2054, generally orthogonal from the face. The first lip 2068, which may include the top edge and first and second side edges of the second backlight enclosure may extend farther away from the wall 2050 than the second lip 2070, which may be formed along the bottom. The first lip 2068 may extend to contact or at least be in close proximity to a confronting face of the second cover 2024. This arrangement may permit heat dissipated by light-emitting elements 2066 and/or LCD 2032 to be removed from the second side of the display device 2010 through the backlight cover 2030 and/or the second cover 2024. As described previously, cooling openings may be formed in the second cover 2024 to facilitate heat removal. The second lip 2070 may be used to support the electronic circuit assembly 2044 along one or more sides, such as the front side along the bottom edge, and may even be configured to facilitate heat removal from the circuit assembly.

Figure 22:
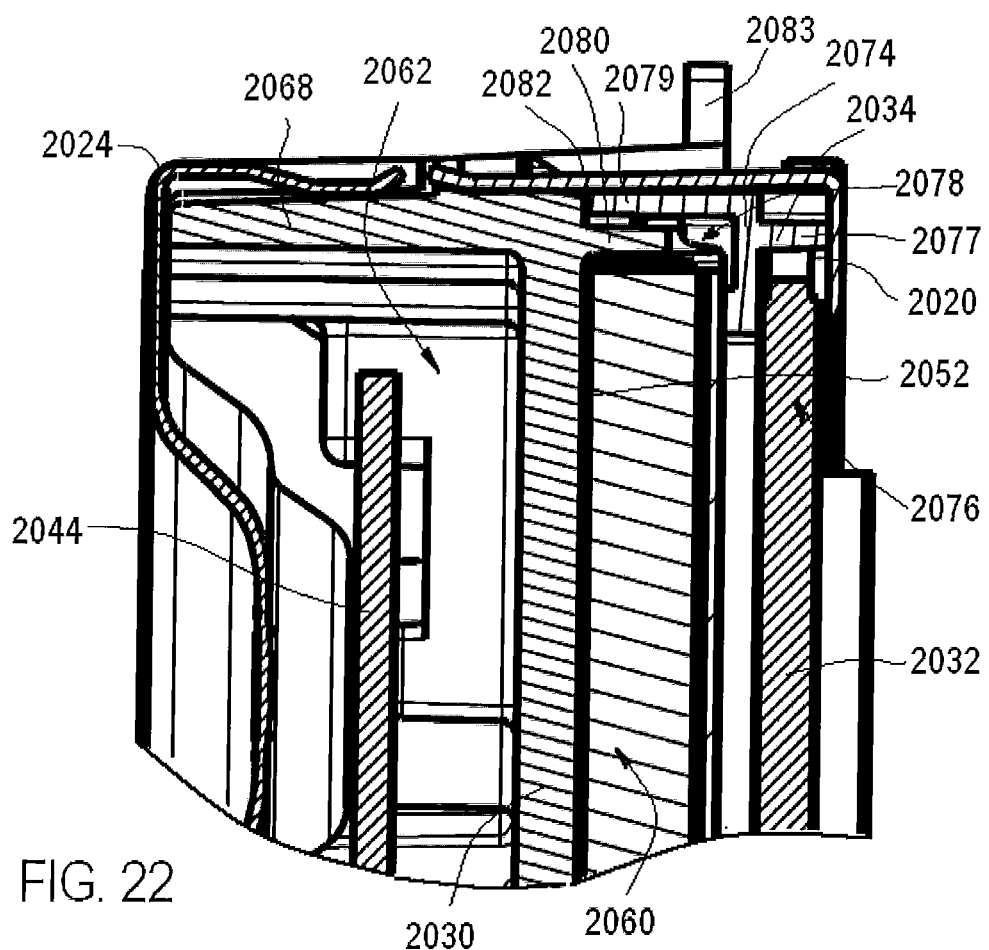
FIG. 22 is a magnified cross sectional view of a portion B of FIG. 20.

FIGS. 21 and 22 are respective top and bottom cross section views to depict an example arrangement of the components of the display device 2010. In FIG. 21, the second lip 2072 of the first backlight enclosure 2060 may extend away from the first face 2052 to cover at least partially the guide plate 2040. The light-emitting elements 2066 may be coupled along the second lip 2072. A wall 2074 extending inward from the margins of the display frame 2034 may define an opening in the display frame 2034 for rear access to the LCD 2032. The display frame wall 2074 may separate the LCD 2032 from the guide plate 2040 and the backlight cover 2030. LCD 2032 may be fixed to a first face such as the front face of the display frame wall 2074 by an adhesive such as glue. The display frame wall 2074 may separate a first display enclosure 2076 and a second display enclosure 2078. The first display enclosure 2076 may includes edges 2077 to enclose the outer edges of the LCD 2032. The second display enclosure 2078 may include edges 2079 to enclose and contact the outer surfaces of the first backlight enclosure 2060 for an interference fit or snap fit to capture the components in between. The first cover 2020 may include edges to enclose and contact the outer surfaces of the display frame 2034 and/or the outer surfaces of the second backlight enclosure 2062 for an interference fit or snap fit. The second cover 2024 may include edges to enclose and contact the outer surfaces of the first cover 2020 and/or the outer surfaces of the second backlight enclosure 2062 for an interference fit or snap fit. The first and second covers 2020 and 2024 may then be coupled to the backlight cover 2030 so that the backlight cover 2030 may provide the primary structural support for the display device. For structural support, the second lip 2072 of the first backlight enclosure 2060, the edge 2079 of the second display enclosure, the edge of the first cover, and the edge of the second cover may be stacked in an overlapping manner in this order or an alternative order.

In FIG. 22, the first lip 2080 of the first backlight enclosure 2060 may extend forward from the first face 2052 to cover at least partially the guide plate 2040. A segment 2079 of the second display enclosure 2078 may be sized to fit within a recess 2082 that is formed along at least the first end of the first backlight enclosure 2060 of the backlight cover 2030. The recess 2082 may be extended further along the first and second side edges of the first backlight enclosure 2060. The recess 2082 may be dimensioned in one direction to receive the segment 2079 of the second display enclosure 2078 in order to form an aligning surface for engaging the first cover 2020, and in a second direction to form a stop for the display frame when assembling the display frame to the backlight cover. The centering protrusion 2083 may extend through slots of the respective first cover 2020 and the display frame 2034. The edges of the first cover 2020 may enclose at least the periphery of the display frame 2034 and extend to directly contact a portion of the second backlight enclosure 2062, such as the first lip 2068 of the second backlight enclosure 2062. The edges of the second cover 2024 may directly contact a portion of the second backlight enclosure 2062 such as along the top and the first and second side edges, where a first edge such as the top edge of the second cover and a first edge such as the top edge of the first cover are adjacent to one another and each overlap the second backlight enclosure. For structural support, the first lip 2080 of the first backlight enclosure 2060, the edge 2079 of the second display enclosure, and the edge of the first cover may be stacked in an overlapping manner in this order or an alternative order.

In FIGS. 20-22, the backlight cover 2030, the display frame 2034, and the first cover 2020 are structured and arranged to enable fast mounting and reduce the number of additional mechanical parts necessary for placing the display device to a target location. This arrangement may result in shortening of the tolerance chain and may increase the accuracy of positioning of the LCD screen within a target location. Limiting the tolerance chain to the individual tolerances of the backlight cover 2030, the display frame 2034, and the front cover 2020, and in some cases to only these three components, may result in precise positioning of the liquid crystal display screen with respect to a target location. For instance, since the components may be coupled with respect to the backlight cover for centering of the LCD screen before mounting at a target location, mounting protrusions, such as mounting protrusion 1521 in FIG. 15, may permit the installer fast centering and mounting of the LCD screen at the target site.

The second display enclosure 2078 of the display frame 2034 with the LCD fixed to a first face of the frame may fit over the periphery of the first backlight enclosure 2060 of the backlight cover 2030 to limit travel in the x-direction and y-direction. The ends of the first backlight enclosure 2060 of the backlight cover may contact a second face of the display frame wall to limit travel of the display frame in the z-direction. The first cover 2020 may fit over the periphery of the backlight cover and the display frame to limit travel in the x-direction and y-direction. The ends of the first display enclosure 2076 of the display frame 2034 may contact a second face of the first cover 2020 to limit travel of the first cover in the z-direction. The first cover 2020 may then be directly coupled to the backlight cover 2030 to fix the relative position of the backlight cover and the display in a centered position. The backlight cover 2030 may be formed monolithically into one piece, such as by aluminum diecast. A single piece backlight cover may then provide removal of heat dissipated from the light-emitting elements and/or LCD, support; shielding and housing to the electronic circuitry assembly; mechanical support for the display device; and mounting features to ease assembly and mounting to a target location. A single piece backlight cover may further provide a compact design with fewer parts to assemble than would be necessary to provide all of the functionality that is provided with the backlight cover. This arrangement may be particularly suitable for deployment within a vehicle, for instance, as part of a vehicle navigation, vehicle communication, and/or entertainment system, where the reduction of assembled components may decrease the affects of vibration caused by a vehicle.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A display apparatus comprising:
a liquid crystal display and a display frame coupled to the liquid crystal display;
a plurality of light-emitting elements configured to backlight the liquid crystal display, the light-emitting elements being arranged along at least one side of the liquid crystal display;
a backlight cover having an enclosure wall separating a first backlight enclosure and a second backlight enclosure, the first backlight enclosure extending toward the liquid crystal display and coupled to the light-emitting elements, the backlight cover comprising a heat-conducting material configured to dissipate heat generated by at least one of the liquid crystal display and the light-emitting elements, where the display frame and the backlight cover are coupled to one another, the backlight cover having mounting element for mounting the display apparatus into a target location inside a vehicle; and
an electronic circuit assembly housed within the second backlight enclosure of the backlight cover, the electronic circuit assembly positioned in close proximity to a confronting face of the enclosure wall of the backlight cover.

2. The display apparatus according to claim 1, where the backlight cover further comprises an electro-conductive material configured to shield the electronic circuit assembly.

3. The display apparatus according to claim 2, where the backlight cover comprises aluminum.

4. The display apparatus according to claim 3, where the backlight cover further comprises an aluminum diecast.

5. The display apparatus according to claim 1, where the second backlight enclosure is defined by sides extending from the enclosure wall, the sides of the second backlight enclosure including a first side and a second side, opposite the first side, where the first side extends farther away from the enclosure wall than the second side.

6. The display apparatus according to claim 5, where the second side of the second backlight enclosure is coupled to the electronic circuit assembly.

7. The display apparatus according to claim 5, further comprising a first housing cover and a second housing cover each coupled to the second backlight enclosure of the backlight cover, the first housing cover and the second housing cover are arranged to enclose the liquid crystal display, the display frame, the backlight cover, and the electronic circuit assembly.

8. The display apparatus according to claim 7, where the second housing cover includes cooling openings formed therein to facilitate the dissipation of heat from at least one of the liquid crystal display and the light-emitting elements.

9. The display apparatus according to claim 1, where the display frame further comprises a display wall separating a first display enclosure and a second display enclosure, and an opening formed in the display wall for access to the liquid crystal display.

10. The display apparatus according to claim 9, where the liquid crystal display is coupled to a first face of the display wall and is enclosed by the first display enclosure extending toward the liquid crystal display.

11. The display apparatus according to claim 9, where the second display enclosure is defined by edges, including a first edge and a second edge, where the second edge extends farther away from the display wall than the first edge.

12. The display apparatus according to claim 11, where the second display enclosure is formed to enclose the first backlight enclosure of the backlight cover.

13. The display apparatus according to claim 9, where the second display enclosure of the display frame and the first backlight enclosure of the backlight cover are arranged to contain at least one of a polarization foil, a dual brightness-enhancement foil, a brightness enhancement foil, a diffuser, a light guide plate, and a reflector.

14. The display apparatus according to claim 1, where the light-emitting elements are positioned on opposite sides of the liquid crystal display.

15. The display apparatus according to claim 1, where the light-emitting elements are positioned along two contiguously adjacent sides of the liquid crystal display.

16. The display apparatus according to claim 1, where the light-emitting elements are positioned on a single side of the liquid crystal display.

17. The display apparatus according to claim 16, where the single side is one of longer sides of the liquid crystal display when the display is rectangular.

18. The display apparatus according to claim 1, where the light-emitting elements are light-emitting diodes positioned in a sequence on a printed circuit board strip.

19. The display apparatus according to claim 1, where the electronic circuit assembly includes display driving circuitry, backlight driving circuitry, display control circuitry, and backlight control circuitry; and the display apparatus further comprises a shielding covering a first face of the electronic circuit assembly opposite to a second face of the electronic circuit assembly, the second face being closer to the confronting face of the backlight cover.

20. The display apparatus of claim 1, wherein the mounting element includes at least one of a first set of protrusions coupled to and extending from a top side of the backlight cover and a bottom side of the backlight cover, and a second set of protrusions coupled to and extending from a right side of the backlight cover and a left side of the backlight cover.

21. A display apparatus comprising:
an integrated LCD and backlight unit comprising: a display frame, a liquid crystal display fixed to the display frame, a light-emitting element configured to backlight the liquid crystal display, and a backlight cover, where the light-emitting element is arranged along at least one side of the liquid crystal display, the backlight cover includes a first backlight enclosure coupled to the light-emitting element, and the backlight cover comprises a heat-conducting material configured to dissipate heat generated by at least one of the liquid crystal display and the light-emitting element, the backlight cover having mounting element for mounting the display apparatus into a target location inside a vehicle; and
a first housing cover formed to enclose the integrated LCD and backlight unit,
where the backlight cover comprises at least one first engaging member to center the display frame and the first housing cover in a first direction, and at least one second engaging member to center the display frame and the first housing cover in a second direction orthogonal to the first direction, the display frame comprises a third engaging member formed to couple to the first engaging member and the second engaging member of the backlight cover, and the front housing cover comprises a fourth engaging member formed to couple to the first engaging member and the second engaging member of the backlight cover.

22. The display apparatus according to claim 21, further comprising an electronic circuit assembly operably coupled to at least one of the liquid crystal display and the light-emitting element, the electronic circuit assembly coupled to the backlight cover.

23. The display apparatus according to claim 22, where the backlight cover further comprises an enclosure wall separating the first backlight enclosure and a second backlight enclosure included in the backlight cover, where the electronic circuit assembly is coupled with the second backlight enclosure.

24. The display apparatus according to claim 23, where the backlight cover further comprises an electro-conductive material that is operable to shield the electronic circuit assembly.

25. The display apparatus according to claim 22, further comprising a second housing cover directly coupled to the second backlight enclosure of the backlight cover, where the backlight cover and the second housing cover are arranged to enclose the electronic circuit assembly.

26. The display apparatus according to claim 25, where a first face of the display frame and the first backlight enclosure of the backlight cover are arranged to contain at least one of a polarization foil, a dual brightness-enhancement foil, a brightness enhancement foil, a diffuser, a light guide plate, and a reflector, and the liquid crystal display is fixed to a second face, opposite the first face, of the display frame.

27. The display apparatus according to claim 21, where each of the first and second engaging members comprises a centering protrusion, and the third engaging member of the display frame comprises a first slot sized to receive the first engaging member and the second engaging member, and the fourth engaging member of the front housing cover comprises a second slot sized to receive the first engaging member and the second engaging member.

28. The display apparatus according to claim 21, where the display frame is sized to enclose the first backlight enclosure of the backlight cover, and the first housing cover is sized to fit over the display frame and the backlight cover.

29. A display apparatus comprising:
a display frame, a liquid crystal display fixed to a first face of the display frame, the display frame having a display enclosure facing opposite the first face;
a backlight cover having an enclosure wall separating a first backlight enclosure and a second backlight enclosure, the first backlight enclosure coupled to a light-emitting element configured to backlight the liquid crystal display, the light-emitting element being arranged along at least one side of the liquid crystal display, the backlight cover configured to dissipate heat generated by at least one of the liquid crystal display and the light-emitting element, where the display enclosure of the display frame is directly coupled to the first backlight enclosure of the backlight cover, the backlight cover having mounting element for mounting the display apparatus into a target location inside a vehicle;
an electronic circuit assembly operably coupled to at least one of the liquid crystal display and the light-emitting element; and
a first housing cover and a second housing cover, the second housing cover directly coupled to the second backlight enclosure of the backlight cover, and arranged to enclose the electronic circuit assembly, the first housing cover directly coupled to the backlight cover, and arranged to enclose the liquid crystal display, the display frame, and a portion of the backlight cover.

30. The display apparatus according to claim 29, where the backlight cover comprises an electro-conductive material that is configured to shield the electronic circuit assembly.

31. The display apparatus according to claim 29, where the backlight cover comprises at least one first engaging member to center in a first direction, at least one second engaging member to center in a second direction, the display frame comprises a third engaging member sized to couple to the at least one first engaging member and the at least one second engaging member of the backlight cover, the first housing cover comprises a fourth engaging member sized to couple to the at least one first engaging member and the at least one second engaging member of the backlight cover.

32. The display apparatus according to claim 29, where the second backlight enclosure of the backlight cover is sized to contain the electronic circuit assembly.

33. The display apparatus according to claim 32, where the display enclosure and the first backlight enclosure of the backlight cover are arranged to contain at least one of a polarization foil, a dual brightness-enhancement foil, a brightness enhancement foil, a diffuser, a light guide plate, and a reflector.

34. A display apparatus comprising:
a display frame, a liquid crystal display fixed to a first face of the display frame;
one or more light-emitting elements to backlight the liquid crystal display, a backlight cover having an enclosure wall separating a first backlight enclosure and a second backlight enclosure, a first face of the enclosure wall configured to cover the one or more light-emitting elements and the area of the liquid crystal display, the backlight cover being configured to dissipate heat generated by at least one of the liquid crystal display and the one or more light-emitting elements,
an electronic circuit assembly positioned close to a second face, opposite the first face, of the enclosure wall of the backlight cover; and
where the backlight cover includes a mounting element for mounting the display apparatus in a target location inside a vehicle, and where the backlight cover is coupled to the display frame, and includes a centering means for centering the display frame relative to the backlight cover.

35. The display apparatus according to claim 34, further comprising a first housing cover coupled to the backlight cover, where the centering means is a first centering means, and the backlight cover includes a second centering means for centering the first housing cover relative to the backlight cover.

36. The display apparatus according to claim 35, further comprising a second housing cover coupled to the backlight cover, the second housing cover including a plurality of openings formed therein to dissipate heat generated by the display apparatus.

* * * * *